US012207218B2

(12) United States Patent
Li et al.

(10) Patent No.: US 12,207,218 B2
(45) Date of Patent: Jan. 21, 2025

(54) DYNAMIC NETWORK CAPABILITY CONFIGURATION

(71) Applicant: InterDigital Patent Holdings, Inc., Wilmington, DE (US)

(72) Inventors: Hongkun Li, Malvern, PA (US); Michael F. Starsinic, Newtown, PA (US); Rocco Di Girolamo, Laval (CA); Catalina Mihaela Mladin, Hatboro, PA (US); Zhuo Chen, Claymont, DE (US); Dale N. Seed, Allentown, PA (US); Jiwan L. Ninglekhu, Conshohocken, PA (US); Quang Ly, North Wales, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 262 days.

(21) Appl. No.: 17/436,703

(22) PCT Filed: Mar. 13, 2020

(86) PCT No.: PCT/US2020/022573
§ 371 (c)(1),
(2) Date: Sep. 7, 2021

(87) PCT Pub. No.: WO2020/186145
PCT Pub. Date: Sep. 17, 2020

(65) Prior Publication Data
US 2022/0159605 A1 May 19, 2022

Related U.S. Application Data

(60) Provisional application No. 62/817,811, filed on Mar. 13, 2019, provisional application No. 62/931,376, filed on Nov. 6, 2019.

(51) Int. Cl.
H04W 60/00 (2009.01)
H04W 76/10 (2018.01)

(52) U.S. Cl.
CPC .......... *H04W 60/00* (2013.01); *H04W 76/10* (2018.02)

(58) Field of Classification Search
CPC ........................... H04W 60/00; H04W 76/10
See application file for complete search history.

(56) References Cited

U.S. PATENT DOCUMENTS

2018/0227873 A1   8/2018  Vrzic et al.
2018/0376445 A1  12/2018  Yoon et al.
(Continued)

FOREIGN PATENT DOCUMENTS

CN   108702723 A    10/2018
KR   20180106998 A  10/2018
(Continued)

OTHER PUBLICATIONS

Huawei et al., "01#4i, 01#4d/01#32: Tailoring UE support and removing NSSP terminology", S2-179344, SA WG2 Meeting #124, 3GPP Draft, Nov. 27-Dec. 1, 2017, 14 pages.
(Continued)

*Primary Examiner* — Curtis B Odom
(74) *Attorney, Agent, or Firm* — Flaster Greenberg P.C.

(57) ABSTRACT

Methods and apparatus are described for configuring desired network capabilities in a service-based network, including a method for a UE to initiate a network capability based registration to configure its desired network capabilities, a method for UEs to initiate a network capability based registration update when UEs are already registered to the network and want to dynamically re-configure their network capabilities, and a method for a network capability based UE configuration update, which allows NFs or ASs to initiate (Continued)

updating the network capabilities in a network slice for the UE.

17 Claims, 26 Drawing Sheets

(56) References Cited

U.S. PATENT DOCUMENTS

| | | | |
|---|---|---|---|
| 2019/0029065 A1 | 1/2019 | Park et al. | |
| 2019/0053147 A1 | 2/2019 | Qiao et al. | |
| 2020/0196382 A1 | 6/2020 | Kawasaki et al. | |
| 2020/0322879 A1* | 10/2020 | Zhu | H04W 60/00 |
| 2021/0076444 A1* | 3/2021 | Shu | H04W 48/16 |
| 2021/0352575 A1* | 11/2021 | Chun | H04W 72/02 |

FOREIGN PATENT DOCUMENTS

| | | |
|---|---|---|
| WO | 2018/034924 A1 | 2/2018 |
| WO | 2018231027 A1 | 12/2018 |
| WO | WO 2018/235792 A1 | 12/2018 |
| WO | 2019032968 A1 | 2/2019 |
| WO | 2019032972 A1 | 2/2019 |

OTHER PUBLICATIONS

Third Generation Partnership Project, "3rd Generation Partnership Project; Technical Specification Group Services and System Aspects; System Architecture for the 5G System; Stage 2 (Release 15)", 3GPP TS 23.501 V15.1.0, Mar. 2018, 201 pages.

Third Generation Partnership Project, "3rd Generation Partnership Project; Technical Specification Group Services and System Aspects; Procedures for the 5G System; Stage 2 (Release 15)", 3GPP TS 23.502 V15.1.0, Mar. 2018, 285 pages.

Third Generation Partnership Project, "3rd Generation Partnership Project; Technical Specification Group Services and System Aspects; Study on Enhancements to the Service-Based Architecture (Release 16)", 3GPP TR 23.742 V0.2.0, Jun. 2018, 39 pages.

Third Generation Partnership Project, "3rd Generation Partnership Project; Technical Specification Group Services and System Aspects; Policy and Charging Control Framework for the 5G System; Stage 2 (Release 16)", 3GPP TS 23.503 V16.1.0, Jun. 2019, 99 pages.

* cited by examiner

DYNAMIC NETWORK CAPABILITY CONFIGURATION

CROSS-REFERENCE TO RELATED APPLICATIONS

This application is the National Stage Application of International Patent Application No. PCT/US2020/022573, filed Mar. 13, 2020, which claims the benefit of priority to U.S. Application No. 62/817,811, filed on 13 Mar. 2019, and U.S. Application No. 62/931,376, filed on 6 Nov. 2019, the entirety of which are incorporated by reference herein.

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

The 5G core network (5GC) comprises a service based architecture (SBA) based on the concept of network slicing and virtualized network functions (NFs). Different network functions, such as for example the Access and Mobility Management Function (AMF), Session Management Function (SMF), and Policy Control Function (PCF), provide different network function services via the service based interface. This implies that the service consumer can use the same message and the same procedure to communicate with the service provider. For example, any NF can subscribe to the same event with the event exposure service provided by the AMF. On the other hand, various network capabilities, such as non-IP data delivery (NIDD), background data transfer (BDT) and power saving mode (PSM), can be implemented through a set of NF services. Under the current SBA framework, a UE can configure and access the network by indicating the requested network slice Selection Assistance Information (NSSAI), which identifies network slice(s). There is no way for UE to directly indicate desired network capabilities.

SUMMARY

While under the current SBA framework of the 5GC, a UE can configure and access the network by indicating the requested NSSAI, which identifies network slice(s), there is no way for the UE to directly indicate desired network capabilities.

Disclosed herein are methods and apparatus for configuring desired network capabilities in a service-based network.

In one aspect, a new framework is described which includes a network capability layer. A UE and AS can dynamically request network capability(ies) (e.g., background data transfer, non-IP data delivery) to support their applications. In one implementation, the UE and AS may not need to have knowledge nor care about which network slice supports the requested network capability, or if the serving network slice is able to support the requested network capability. A Core Network entity may determine and configure a network slice that supports all the requested network capabilities.

In another aspect, a method is described for a UE to initiate a network capability based registration to configure its desired network capabilities.

In still another aspect, a method is described for UEs to initiate a network capability based registration update when UEs are already registered to the network and want to dynamically re-configure their network capabilities.

In yet another aspect, a method is described for a network capability based UE configuration update, which allows NFs or Application Servers to initiate updating the network capabilities in the network slice for the UE.

An extended service based architecture is also described which includes interfaces with a User Plane Function (UPF) and services provided by a UPF.

A mechanism by which the network may deliver network capability information called Network Capability Profile (NCP) for a network slice to the UE.

A method in which a UE may be informed by the network about an alternative network slice with comparable network capability profile based on the UE's requested network capability. A mechanism for UEs to initiate a network capability based registration to configure its desired network capabilities.

A mechanism by which a UE can receive a set of Allowed NSSAIs with their corresponding NCPs during general UE registration procedure. The UE may be able to request an alternative network slice based on the NCP list of allowed S-NSSAIs received from the core network, if the capabilities indicated by the received NCPs are insufficient for the applications in the UE.

A mechanism by which NCP(s) for network slice(s) are delivered to the UE as a part of the UE Polices during UE Policies update procedure.

Mechanisms by which core network enforces the maximum number of PDU sessions per network slice and handles the requests that are received after the maximum limit has been attained during PDU Session Establishment procedure.

A mechanism in which core network handles the maximum limit on number of PDU sessions per network slice in which network periodically informs the UE via NAS message that the network slice has attained its maximum limit so that UE can wait before re-attempting.

A mechanism by which core network enforces the maximum number of UEs registration per network slice and handles the registration requests that are received after the maximum limit has been attained This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1A:
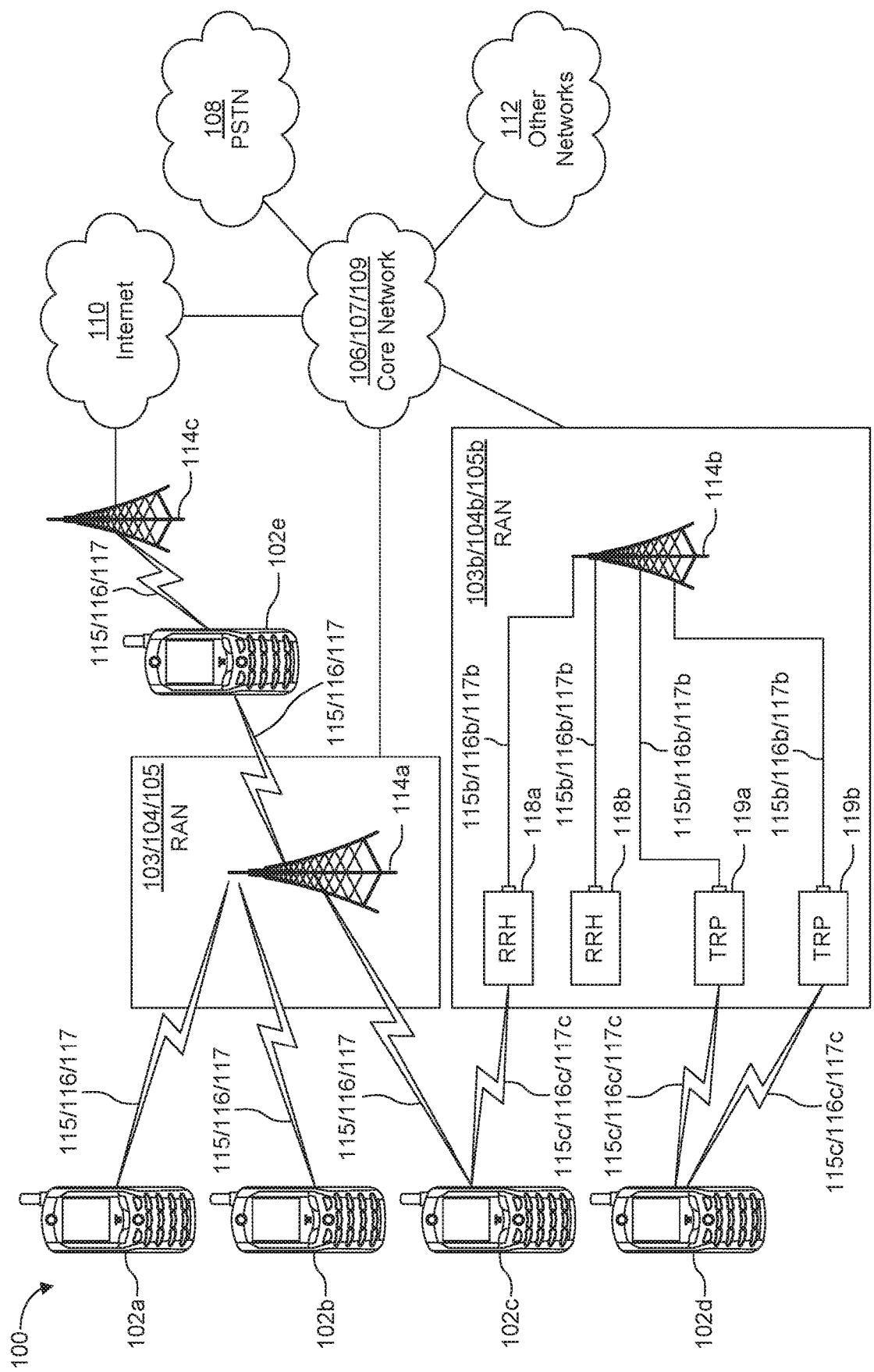
FIG. 1A illustrates an example communications system.

The following is a list of acronyms that may appear in the following description. Unless otherwise specified, the acronyms used herein refer to the corresponding terms listed below:

5GC 5G Core
AF Application Function
AMF Access and Mobility Management Function
AS Application Server
CN Core Network
CP Control Plane
DL Downlink
DNN Data Network Name
EPC Evolved Packet Core
GUTI Globally Unique Temporary Identifier
LTE Long Term Evolution
MBMS Multimedia Broadcast/Multicast Service
MME Mobility Management Entity
NAS Non Access Stratum
NCMF Network Capability Management Function
NCP Network Capability Profile
NEF Network Exposure Function
NF Network Function
NIDD Non-IP Data Delivery
NRF NF Repository Function
NSSAI network slice Selection Assistance Information
NSSF network slice Selection Function
NSI network slice Instance
PCF Policy Control Function
PDU Protocol Data Unit
PSM Power Saving Mode
QoS Quality of Service
RAN Radio Access Network
PLMN Public Land Mobile Network
SBA Service Based Architecture
SCS Service Capability Server
SD Slice Differentiator
SM Session Management
SMF Session Management Function
SMSF Short Message Service (SMS) Function
S-NSSAI Single network slice Selection Assistance Information
SST Slice/Service Type
SUPI Subscription Permanent Identifier
UDM/UDR Unified Data Management/Unified Data Repository
UE User Equipment
UL Uplink
UPF User Plane Function The following terms may have the following meanings:

"Core network" refers to the central, or core, part of a telecommunication network, which offers numerous communication services to customers who are interconnected by the radio access network. A core network typically comprises a number of entities that perform the functionality of the core network. As used herein, the term "core network entity" refers to any entity that performs functionality of a core network, such as, for example, a AMF, UDR/UDSF, UDM/UDR, NRF, NEF, PCF, NF, SMF, AUSF, NSSF, or the like, as described herein. It is understood that such core network entities may be logical entities that are implemented in the form of software (i.e., computer-executable instructions) stored in a memory of, and executing on a processor of, an apparatus configured for wireless and/or network communications or a computer system such as those illustrated in FIG. 1B or FIG. 1G.

"Network function (NF)" refers to a processing function in a network, which has defined functional behavior and defined interfaces. An NF can be implemented either as a network element on a dedicated hardware, or as a software instance running on a dedicated hardware, or as a virtualized function instantiated on an appropriate platform, e.g., on a cloud infrastructure.

"Network function instance" refers to an identifiable instance of an NF.

A "network function (NF) service" may be one type of capability exposed by an NF ("NF service producer") to another authorized NF ("NF service consumer") through a service-based interface. A network function may expose one or more NF services. For example, the 5G AMF provides a Namf EventExposure service, which enables the AMF to send notification to NFs that subscribe to certain mobility management related events.

"NF service instance" refers to an identifiable instance of an NF service.

A "network capability" comprises a transport network feature that the core network implements and provides to its users (e.g., a UE or Application Server). Examples of network capabilities include background data transfer and event monitoring. A network capability is enabled through one or mode NF services of one or more NFs.

A "network slice" is a logical network that provides specific network capabilities and network characteristics.

A "network slice instance" comprises a set of NF instances and the required resources (e.g., computing, storage and networking resources) which form a deployed network slice.

A "network capability profile" is an information profile for each network slice maintained by NCMF, which indicates what Network Capabilities are supported by a Network Slice.

A "network capability management function" is an NF that configures the network slice to serve the UE/AS with a set of desired network capabilities. The NCMF may be part of the OAM system.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G." 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that New Radio (NR) is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-G as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b* and/or TRPs 119*a*, 119*b* over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b* and/or TRPs 119*a*, 119*b* may communicate with one or more of the WTRUs 102*c*, 102*d* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology.

In an embodiment, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
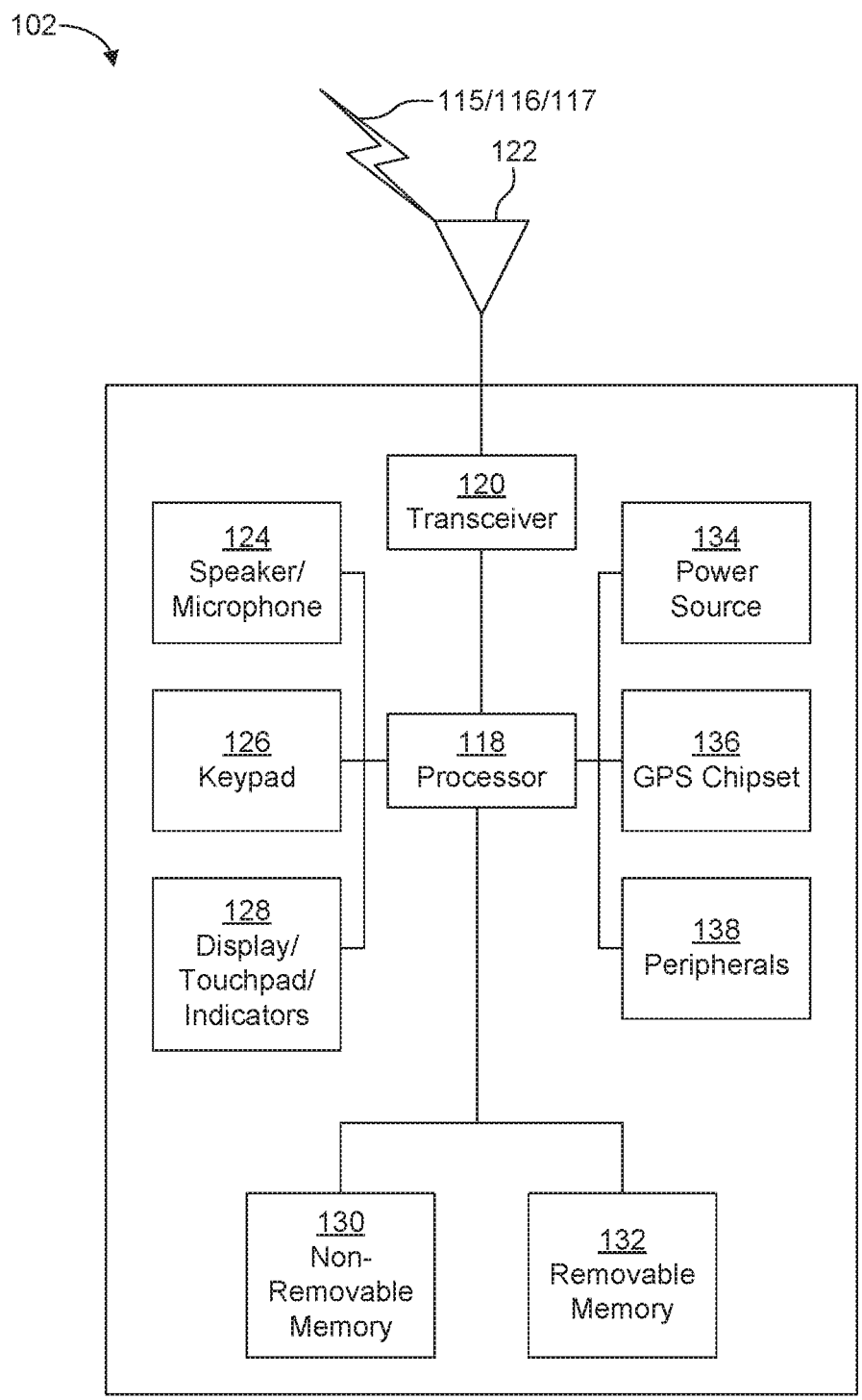
FIG. 1B is a block diagram of an example apparatus or device configured for wireless communications such as, for example, a wireless transmit/receive unit (WTRU)

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
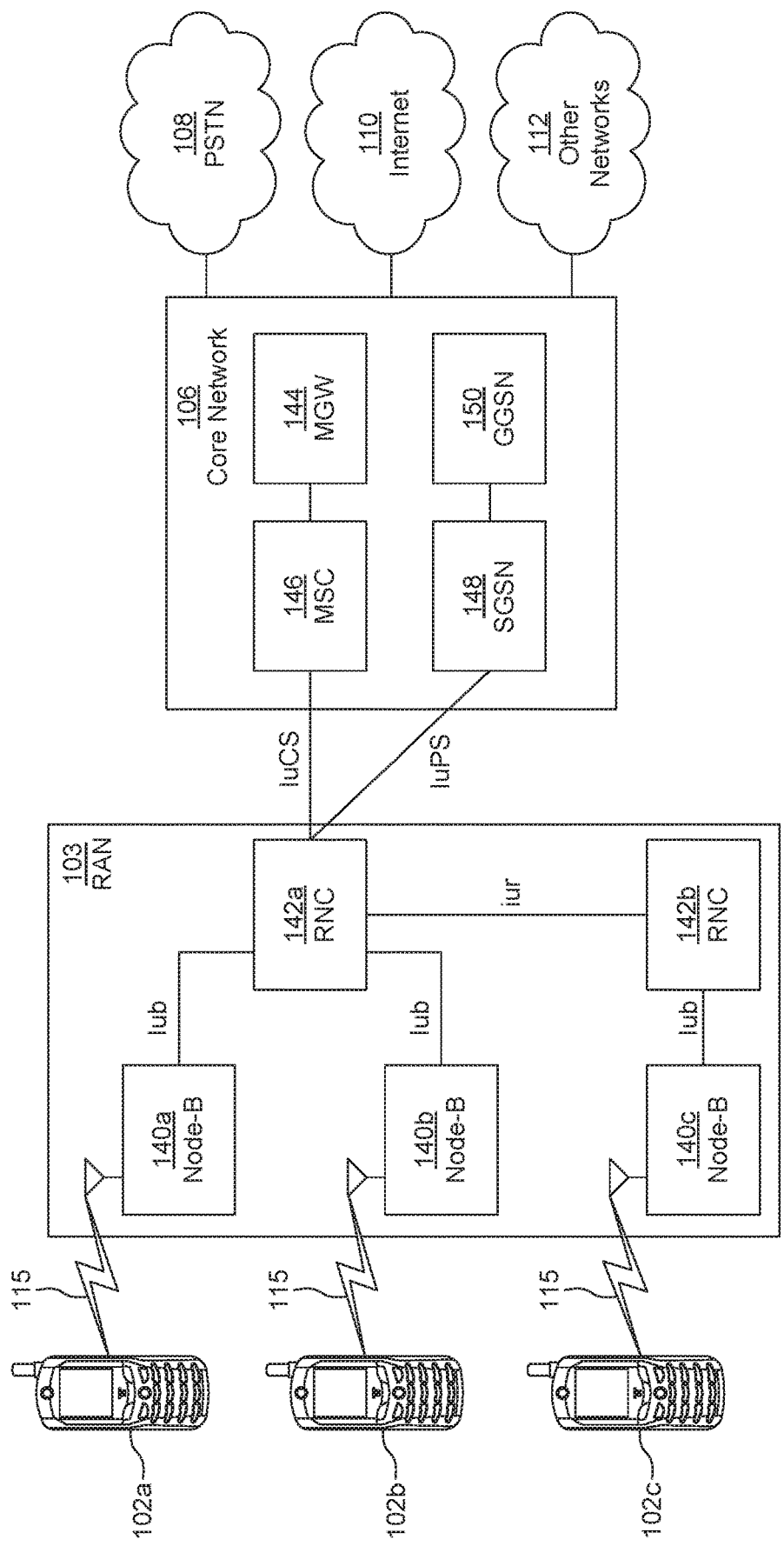
FIG. 1C is a system diagram of an example radio access network (RAN) and core network.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
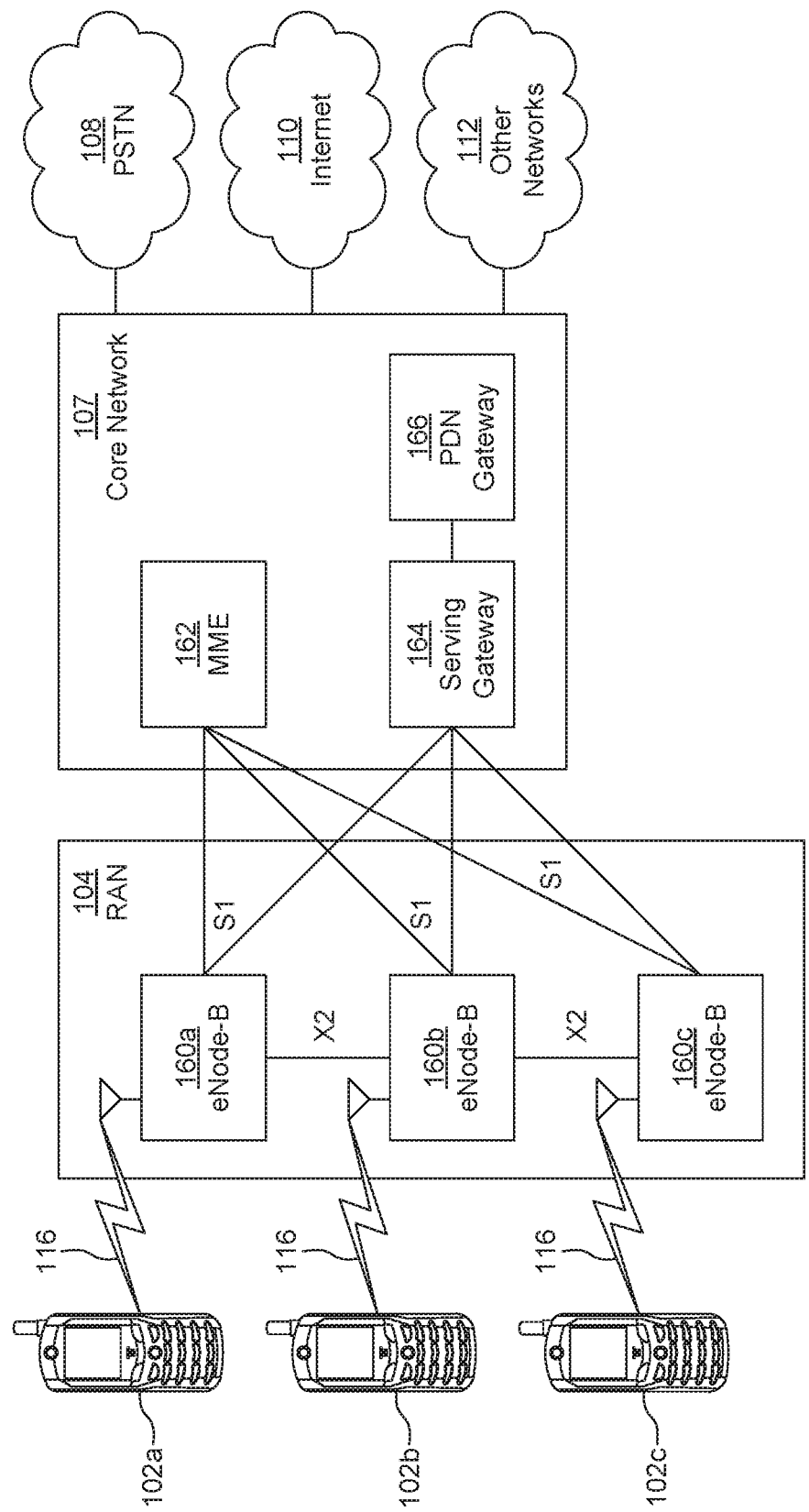
FIG. 1D is a system diagram of another example RAN and core network.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
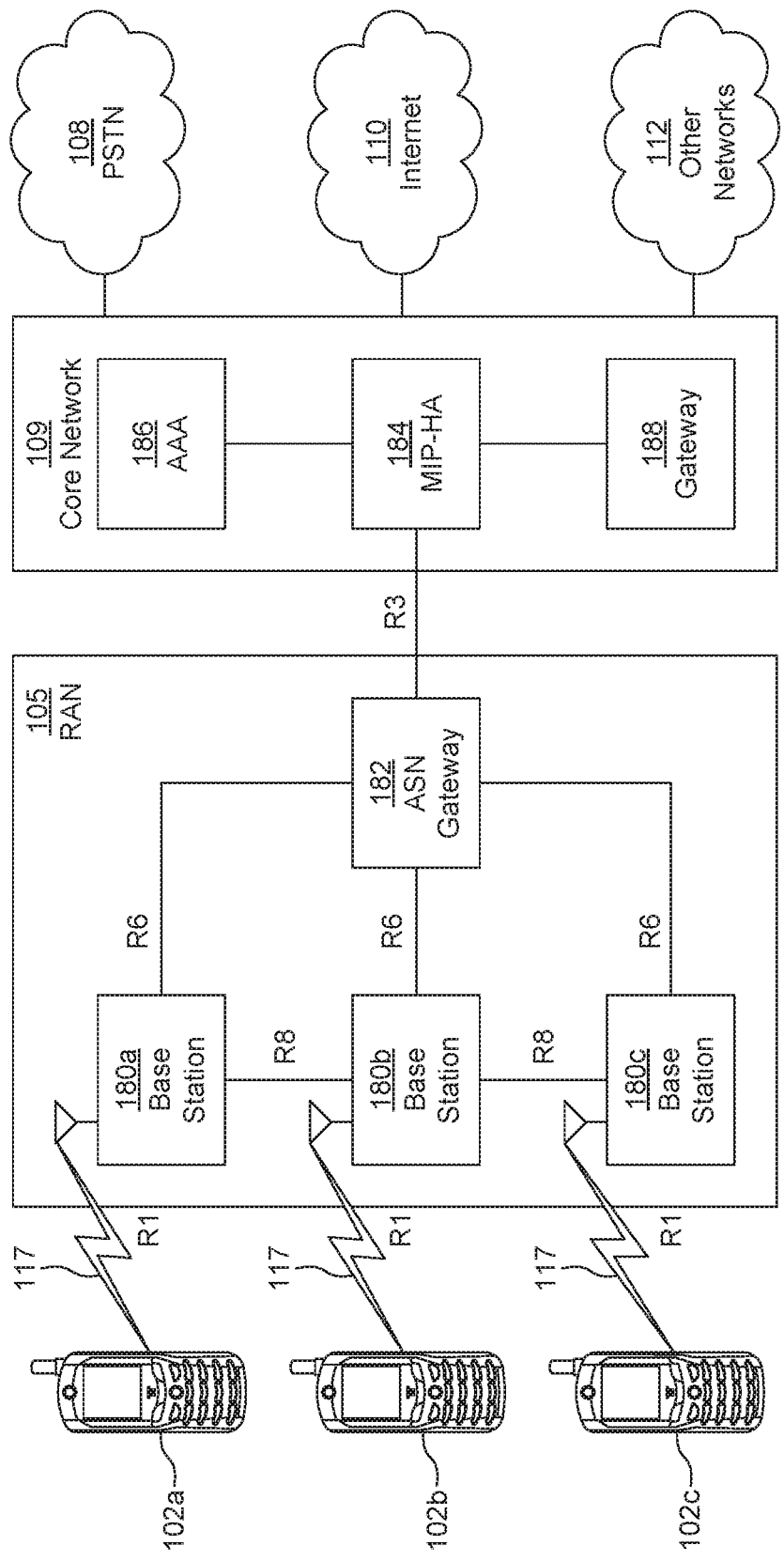
FIG. 1E is a system diagram of another example RAN and core network.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1-6 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1-6 are provided by way of example only, and it is understood that the subject matter disclosed and claimed herein may be embodied or implemented in any similar communication system, whether presently defined or defined in the future.

Figure 1F:
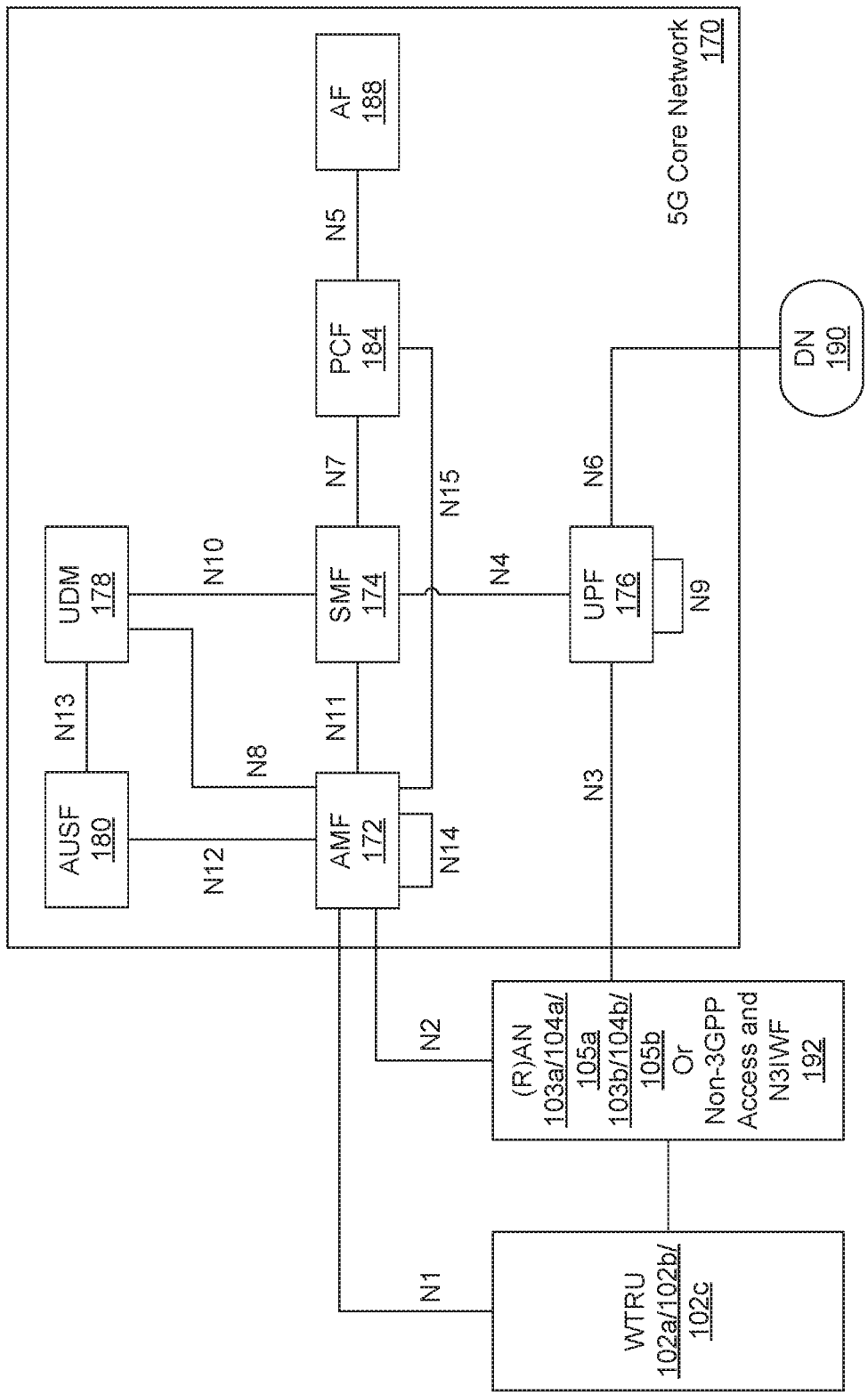
FIG. 1F is a system diagram of another example RAN and core network.

The 5G core network 170 shown in FIG. 1F may include an access and mobility management function (AMF) 172, a session management function (SMF) 174, a user plane function (UPF) 176, a user data management function (UDM) 178, an authentication server function (AUSF) 180, a Network Exposure Function (NEF), a policy control function (PCF) 184, a non-3GPP interworking function (N3IWF) 192 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 1F shows that network functions directly connect to one another, however, it should be appreciated that they may communicate via routing agents such as diameter routing agents or message buses.

The AMF 172 may be connected to each of the RAN 103/104/105/103b/104b/105b via an N2 interface and may serve as a control node. For example, the AMF 172 may be responsible for registration management, connection management, reachability management, access authentication, access authorization. The AMF 172 may generally route and forward NAS packets to/from the WTRUs 102a, 102b, 102c.

The SMF 174 may be connected to the AMF 172 via an N11 interface, may be connected to a PCF 184 via an N7 interface, and may be connected to the UPF 176 via an N4 interface. The SMF 174 may serve as a control node. For example, the SMF 174 may be responsible for Session Management, WTRUs 102a, 102b, 102c IP address allocation & management and configuration of traffic steering rules in the UPF 176, and generation of downlink data notifications.

The SMF 174 may also be connected to the UPF 176, which may provide the WTRUs 102a, 102b, 102c with access to a data network (DN) 190, such as the Internet 110, to facilitate communications between the WTRUs 102a, 102b, 102c and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102a, 102b, 102c and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 172, 184, 176, and N3IWF) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN 108. For example, the core network 170 may include, or communicate with a short message service (SMS) service center that facilities communication via the short message service. For example, the 5G core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

Figure 1G:
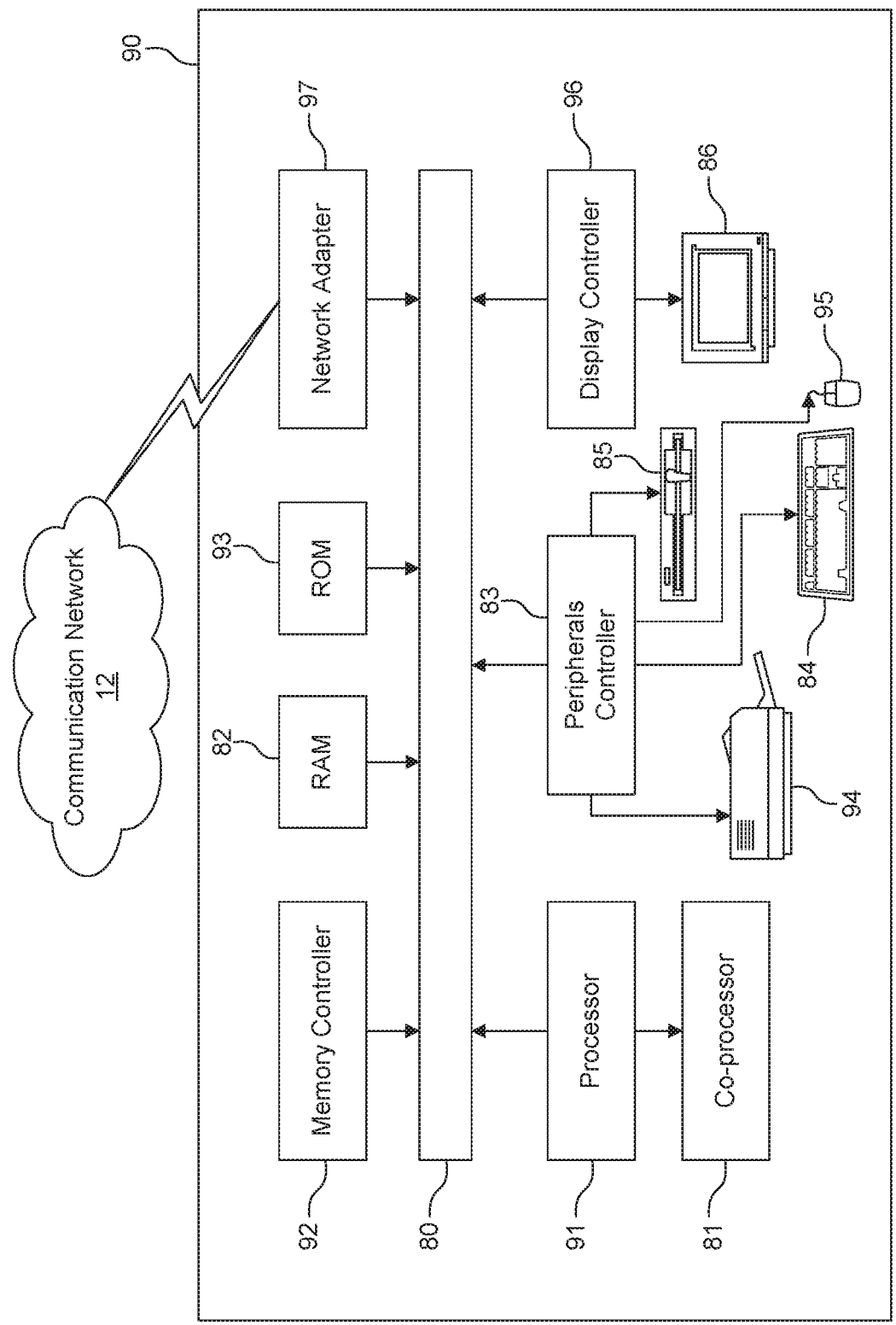
FIG. 1G is a block diagram of an example computing system in which a node, entity, device, or other apparatus of a communication system may be embodied.

FIG. 1G is a block diagram of an exemplary computing system 90 in which one or more apparatuses of the communications networks illustrated or described herein may be embodied, such as certain nodes or functional entities in the RAN 103/104/105, Core Network 106/107/109, PSTN 108, Internet 110, or Other Networks 112.

Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1-6, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Figure 2A:
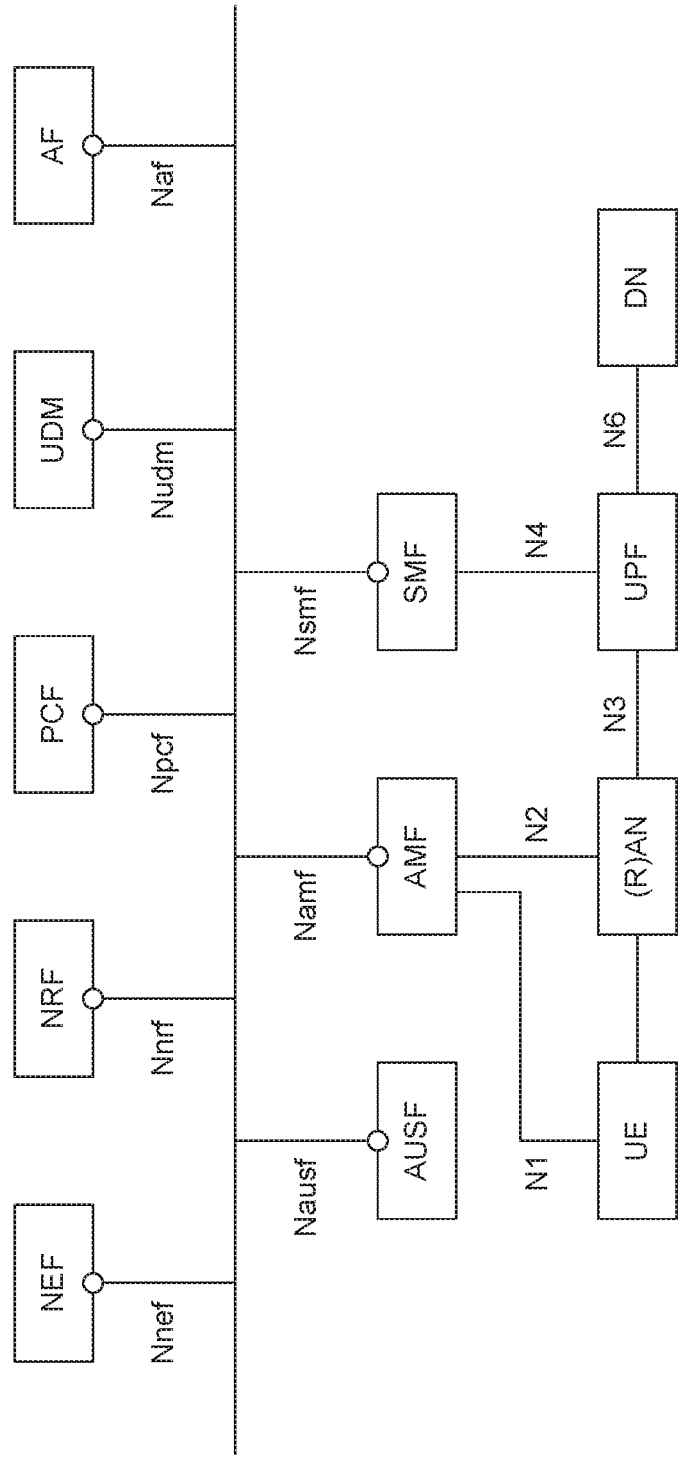
FIG. 2A shows the non-roaming 5G reference architecture with service-based interfaces with the control plane.
Figure 2B:
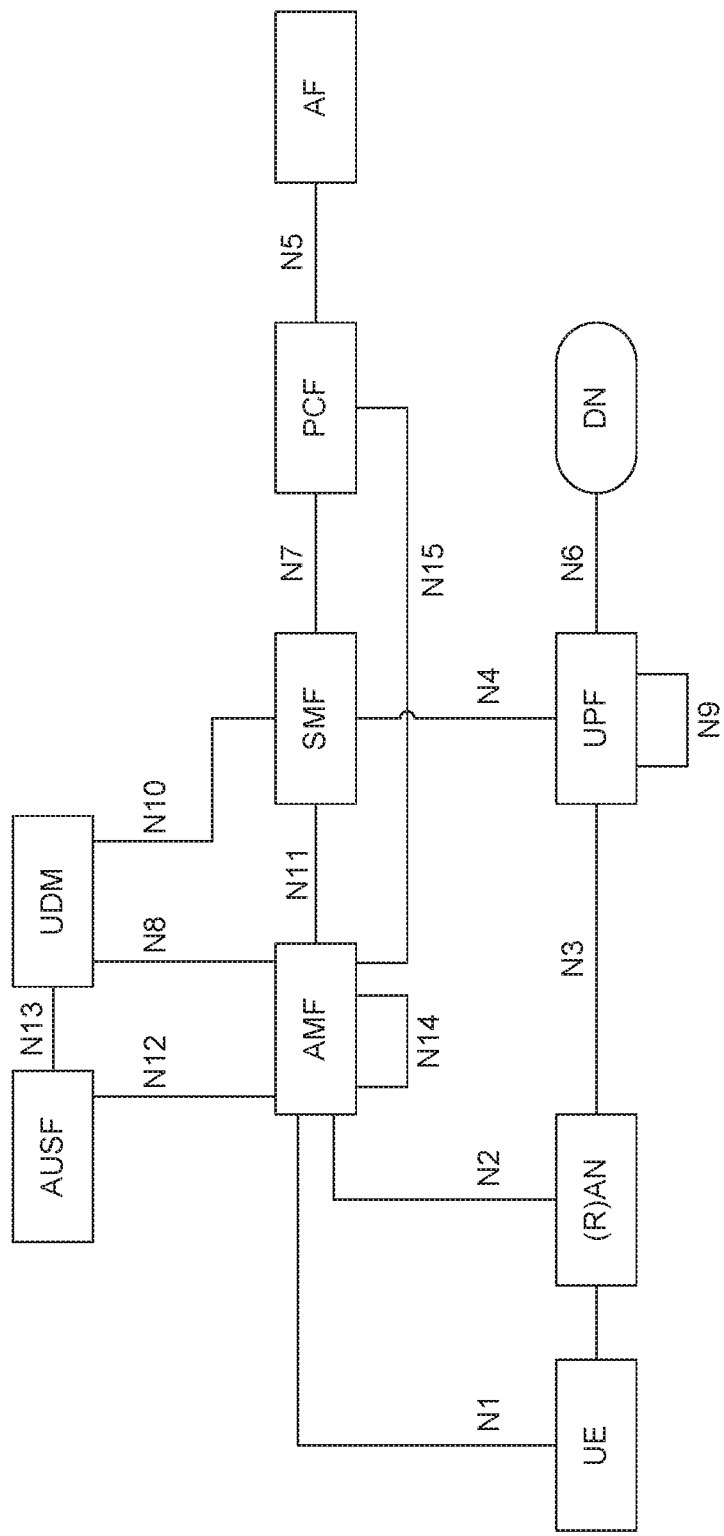
FIG. 2B shows the non-roaming 5G system architecture in reference point representation.

FIG. 2A is a block diagram of a non-roaming network architecture for the 5G network with service-based interfaces within the control plane of the network. FIG. 2B is a block diagram presenting another view of the 5G network of FIG. 2A and illustrating the reference points through which various network functions interact. Note that the mobility management and session management functions are separated. A single N1 NAS connection is used for both Registration Management and Connection Management (RM/CM) and for SM-related messages and procedures for a UE. The single N1 termination point is located in AMF. The AMF forwards SM related NAS information to the SMF. AMF handles the Registration Management and Connection Management part of NAS signaling exchanged with the UE. SMF handles the Session management part of NAS signaling exchanged with the UE.

The 5G system architecture is defined to support data connectivity and services enabling deployments to use techniques such as Network Function Virtualization (NFV) and Software Defined Networking (SDN). The 5G system architecture is designed to leverage service-based interactions between Control Plane (CP) Network Functions where identified.

As defined above, an NF is a processing function in a network, which has defined functional behavior and defined interfaces. An NF can be implemented either as a network element on a dedicated hardware, or as a software instance running on a dedicated hardware, or as a virtualized function instantiated on an appropriate platform, such as on a cloud infrastructure.

Figure 3:
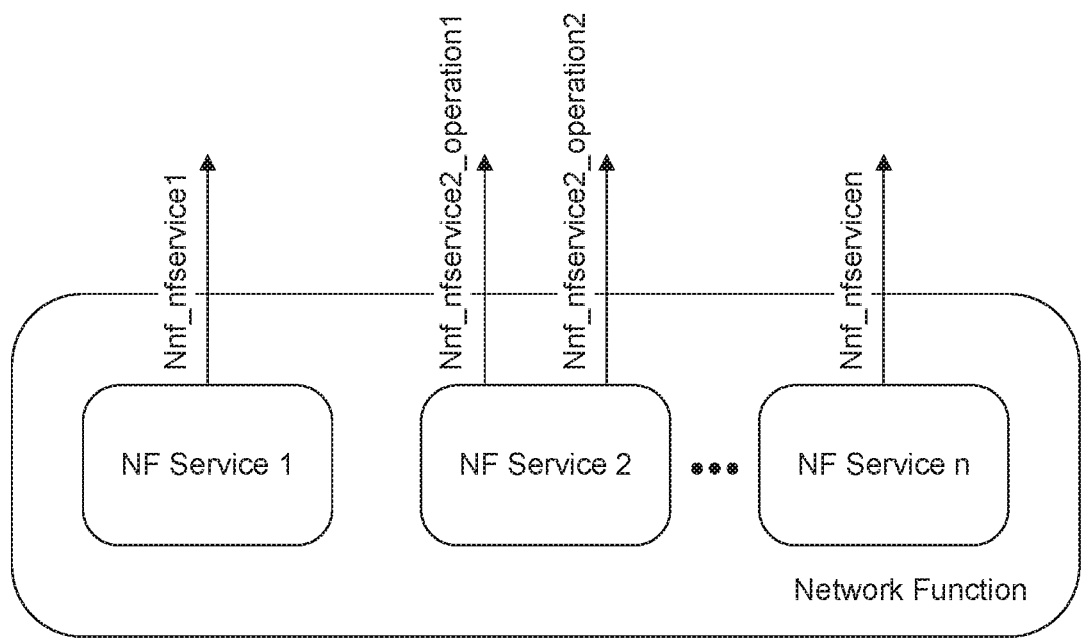
FIG. 3 shows an example of network function, NF service and NF service operation.

As further defined above, an NF service is one type of capability exposed by an NF ("NF service producer") to other authorized NF ("NF service consumer") through a service-based interface. An NF may expose one or more NF services. Generally, an NF service is offering a capability to authorized consumers. NFs may offer different capabilities and thus, different NF services to distinct consumers. Each of the NF services offered by a NF is designed to be self-contained, reusable and use management schemes independently of other NF services offered by the same NF, for example for scaling, healing, etc. Each NF service is designed to be accessible by means of an interface. An interface may consist of one or several operations. FIG. 3 shows relations between an NF, NF service and its operations.

Figure 4:
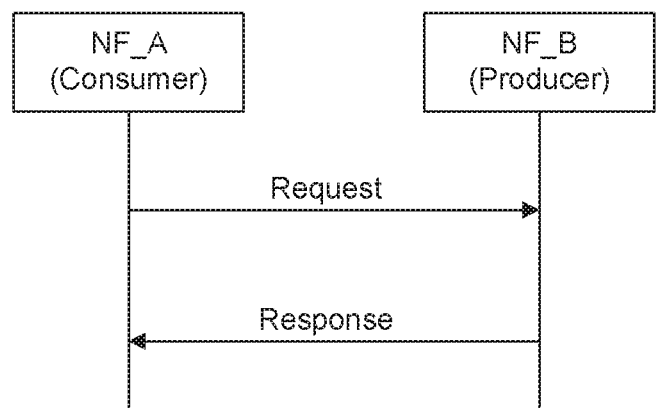
FIG. 4 shows an example of a "request-response" NF service.

The interaction between two network functions (consumer and producer) within this NF service framework follows two mechanisms:

"Request-response": A Control Plane NF_B (NF service producer) is requested by another Control Plane NF_A (NF service consumer) to provide a certain NF service, which either performs an action or provides information or both. NF_B provides an NF service based on the request by NF_A. In order to fulfil the request, NF_B may in turn consume NF services from other NFs. In this request-response mechanism, communication is one-to-one between two NFs (consumer and producer) and a one-time response from the producer to a request from the consumer is expected within a certain timeframe. FIG. 4 shows the flow of the request-response communication mechanism.

Figure 5:
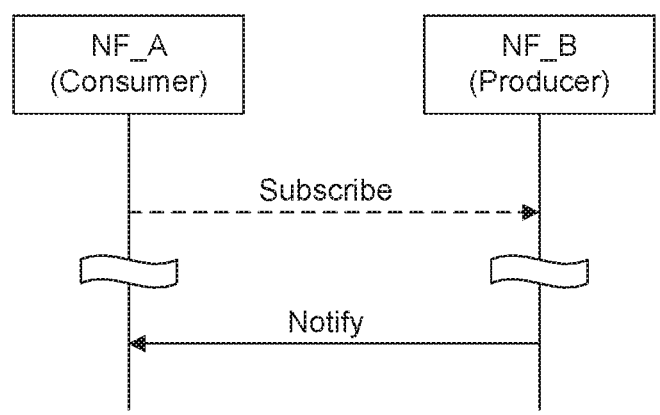
FIG. 5 shows an example of a "subscriber-notify" NF service.

"Subscribe-Notify": A Control Plane NF_A (NF service consumer) subscribes to NF service offered by another Control Plane NF_B (NF service producer). Multiple Control Plane NFs may subscribe to the same Control Plane NF Service. NF_B notifies the results of this NF service to the interested NF(s) that subscribed to this NF service. The subscription request shall include the notification endpoint (e.g. the notification URL) of the NF service consumer to which the event notification from the NF service producer should be sent to. In addition, the subscription request may include a notification request for periodic updates or notification triggered through certain events (e.g., the information requested gets changed, reaches a certain threshold, etc.). FIG. 5 shows the flow of the subscription-notification communication mechanism.

As an example, Table 1 shows the AMF Services and AMF Service Operations defined in 3GPP TS 23.502, Procedures for the 5G System; Stage 2, v 15.1.0, Release 15, 2018-03.

TABLE 1

List of AMF Services

| Service Name | Service Operations | Operation Semantic | Known Consumer(s) |
| --- | --- | --- | --- |
| Namf_Communication | UEContextTransfer | Request/Response | Peer AMF |
| | RegistrationCompleteNotify | Subscribe/Notify | Peer AMF |

TABLE 1-continued

List of AMF Services

| Service Name | Service Operations | Operation Semantic | Known Consumer(s) |
|---|---|---|---|
| | N1MessageNotify | Subscribe/ Notify | SMF, SMSF, PCF, NEF, LMF |
| | N1MessageSubscribe | | SMF, SMSF, PCF, NEF |
| | N1MessageUnSubscribe | | SMF, SMSF, PCF, NEF |
| | N1N2MessageTransfer | Request/ Response | SMF, SMSF, PCF, NEF, LMF |
| | N2InfoSubscribe | Subscribe/ Notify | SMF |
| | N2InfoUnSubscribe | | SMF |
| | N2InfoNotify | | SMF, LMF |
| | EBIAssignment | Request/ Response | SMF |
| | AMFStatusChangeSubscribe | Subscribe/ Notify | SMF, PCF, NEF, SMSF, UDM |
| | AMFStatusChangeUnSubscribe | Subscribe/ Notify | SMF, PCF, NEF, SMSF, UDM |
| | AMFStatusChangeNotify | Subscribe/ Notify | SMF, PCF, NEF, SMSF, UDM |
| Namf_EventExposure | Subscribe | Subscribe/ Notify | NEF, SMF, PCF, UDM |
| | Unsubscribe | Subscribe/ Notify | NEF, SMF, PCF, UDM |
| | Notify | Subscribe/ Notify | NEF, SMF, PCF, UDM |
| Namf_MT | EnableUEReachability | Request/ Response | SMSF |
| Namf_Location | ProvideLocation | Request/ Response | GMLC |
| | EventNotify | Subscribe/ Notify | GMLC |

Network slicing is a mechanism that could be used by mobile network operators to support multiple 'virtual' networks behind the air interface across the fixed part of the mobile operator's network, both backhaul and core network. This involves 'slicing' the network into multiple virtual networks to support different radio access networks (RANs) or different service types running across a single RAN. Network slicing enables the operator to create networks customized to provide optimized solutions for different market scenarios which demands diverse requirements, e.g. in the areas of functionality, performance, and isolation.

As defined above, a network slice may comprise a logical network that provides specific network capabilities and network characteristics. A network slice within a PLMN includes the core network control plane and user plane NFs. A network slice instance comprises a set of NF instances and the required resources (e.g. computing, storage, and networking resources) which form a deployed network slice.

Network slices may differ for supported features and network function optimizations, in which case such network slices may be of different slice/service types. The operator can deploy multiple network slice instances delivering the same features but for different groups of UEs, e.g. as they deliver a different committed service and/or because they are dedicated to a customer, in which case such network slices may be of the same slice/service type but are distinguished through different slice differentiators.

The network may serve a single UE with one or more network slice instances simultaneously via a 5G-AN and associated with at most eight different S-NSSAIs in total, regardless of the access type(s) over which the UE is registered (i.e. 3GPP Access and/or N3GPP Access). The AMF instance serving the UE logically belongs to each of the network slice instances serving the UE, i.e. this AMF instance is common to the network slice instances serving a UE.

A network slice is identified by an S-NSSAI, which is comprised of:
  A Slice/Service type (SST), which refers to the expected network slice behavior in terms of features and services;
  A Slice Differentiator (SD), which is optional information that complements the Slice/Service type(s) to differentiate amongst multiple network slices of the same Slice/Service type.

An S-NSSAI can have standard values (i.e. such S-NSSAI is only comprised of an SST with a standardized SST value, and no SD) or non-standard values (i.e. such S-NSSAI is comprised of either both an SST and an SD or only an SST without a standardized SST value and no SD). An S-NSSAI with a non-standard value identifies a single network slice within the PLMN with which it is associated. An S-NSSAI with a non-standard value shall not be used by the UE in access stratum procedures in any PLMN other than the one to which the S-NSSAI is associated. Table 2 shows the standardized SST values as defined in 3GPP TS 23.501, System Architecture for the 5G System; Stage 2, v 15.1.0, Release 15, 2018-03.

The NSSAI is a collection of S-NSSAIs. An NSSAI may be a Configured NSSAI, a Requested NSSAI or an Allowed NSSAI. There can be at most eight S-NSSAIs in Allowed and Requested NSSAIs sent in signaling messages between the UE and the network. The Requested NSSAI signaled by the UE to the network allows the network to select the Serving AMF, network slice(s) and network slice instance(s) for this UE.

TABLE 2

Standardised SST values

| Slice/<br>Service type | SST<br>value | Characteristics. |
|---|---|---|
| eMBB | 1 | Slice suitable for the handling of 5G enhanced Mobile Broadband. |
| URLLC | 2 | Slice suitable for the handling of ultra- reliable low latency communications. |
| MIoT | 3 | Slice suitable for the handling of massive IoT. |

Based on the operator's operational or deployment needs, a network slice instance can be associated with one or more S-NSSAIs, and an S-NSSAI can be associated with one or more network slice instances. Multiple network slice instances associated with the same S-NSSAI may be deployed in the same or in different Tracking Areas. When multiple network slice instances associated with the same S-NSSAI are deployed in the same Tracking Areas, the AMF instance serving the UE may logically belong to (i.e. be common to) more than one network slice instance associated with this S-NSSAI.

Figure 6:
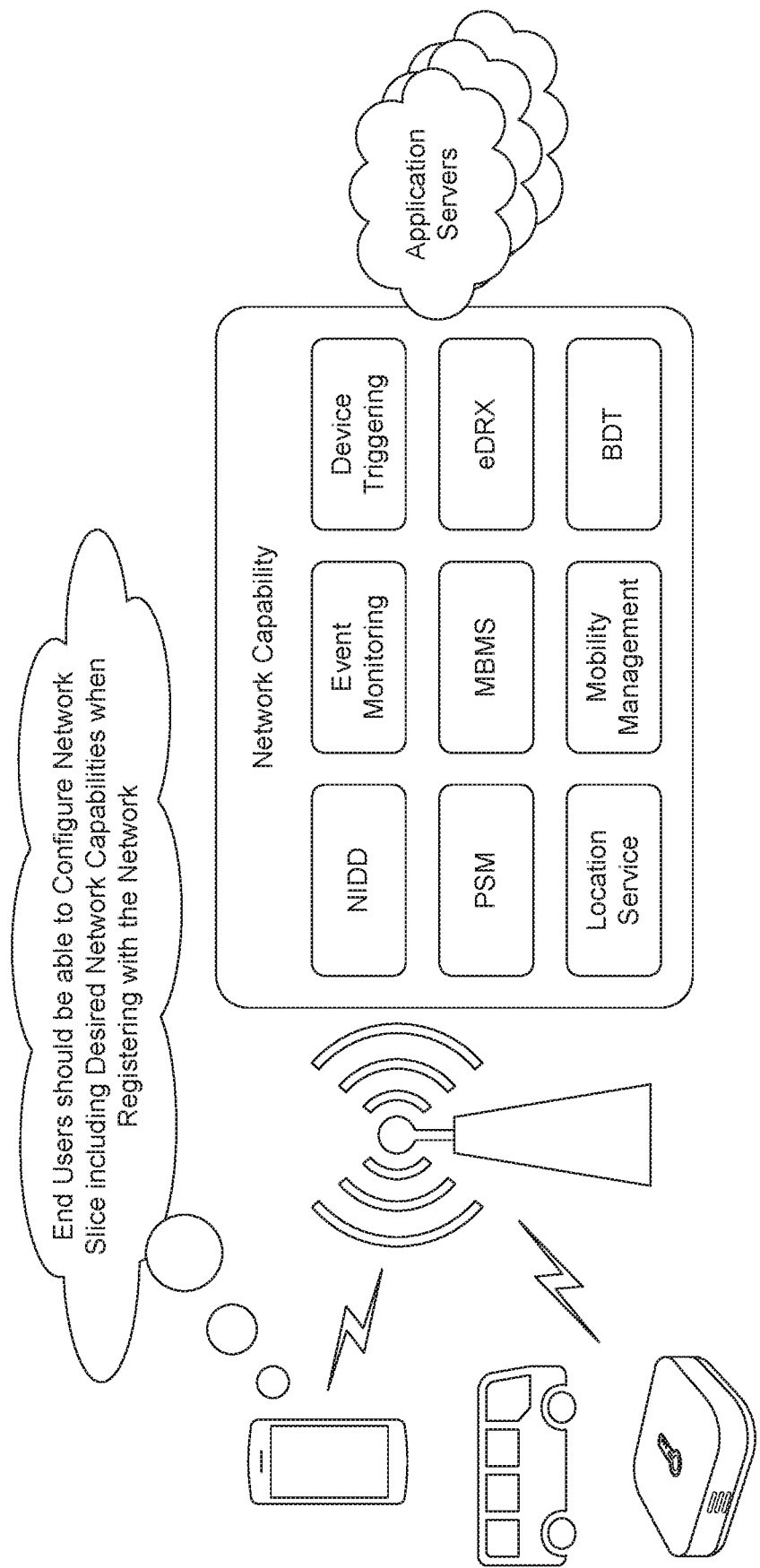
FIG. 6 shows a network capability configuration use case.

With reference to FIG. 6, and as mentioned above, the 5GC defines a service based architecture (SBA) based on the concept of network slicing and virtualized network functions (NFs). Different network functions (e.g., AMF, SMF and PCF) provide different network function services via the service based interface. This implies that the service consumer can use the same message and the same procedure to communicate with the service provider. For example, any NF can subscribe to the same event with the event exposure service provided by the AMF. On the other hand, various network capabilities, such as non-IP data delivery (NIDD), background data transfer (BDT) and power saving mode (PSM), can be implemented through a set of NF services. Under the current SBA framework, the UE may configure and access the network by indicating the requested NSSAI, which identifies network slice(s). However, there is no way for a UE to directly indicate desired network capabilities.

For example, a vehicle running a V2X application may want to use background data transfer (BDT), Multimedia Broadcast/Multicast Service (MBMS) and event monitoring capabilities. Either the UE or the corresponding V2X application server needs to establish a configuration with the Core Network (CN), so that the network slice serving the UE has the desired network capabilities. On the other hand, a smart home device integrating sensors and a camera may want to utilize a different set of network capabilities, such as NIDD, data buffering, group messaging and device triggering. The device may not have a graphical interface to allow human intervention, which is common for many IoT devices. It would be desirable for the network to be able to automatically configure the network slice based on the different levels (e.g., level of network capability, level of network slice identifier, or level of NF services) of input from the devices.

As further discussed above, the service based architecture of the 5GC consists of multiple virtualized network functions. Each network function provides a set of network function services through the service based interfaces. Therefore, network capabilities (e.g., event monitoring, location service) can be implemented through a set of network function services. Any entity (e.g., NF, UE and SCS/AS) can subscribe to a service by invoking the same operations. However, there are a few restrictions on the existing SBA defined by 5GC First, the granularity of the network function services prevents flexible network capability configurations. Each network function provides various network function services from different aspects (e.g., AMF provides mobility management, location management, and event monitoring/exposure service), and each network capability may require a different set of network function services from different network functions. For example, an IoT device may require the MIoT services by setting the value of Slice/Service type to MIoT. However, there is no way for the UE to indicate a certain specific network capability it wants, such as non-IP data delivery or the event monitoring/reporting capability. In another example, a V2X application server (AS) may require enablement of the background data transfer (BDT) capability. Based on the current network function framework, the BDT capability requires the Npcf_BDTPolicyControl NF service provided by the PCF, and the Nnef_BDTPNegotiation NF service provided by the NEF for determining the BDT policy. Moreover, the Nsmf_PDUSession provided by the SMF is required to manage the PDU session for future data transfer. It is difficult for a UE/AF/AS to figure out what network function services are needed for BDT. In fact, it is not necessary to require the UE or SCS/AS to be aware of those network function services to enable the BDT. The UE and AS will be more interested in the network capabilit(ies) than the NF services.

Second, when a UE registers with the Core Network, it may provide an indication of the type of slice to which it wants to connect—for example, in the Requested NSSAI. However, this information may be PLMN specific and not standardized, and as a result, it may not be known to the UE—for example the first time the UE registers, or if a UE is roaming. In such cases, it is not possible for the UE to include this information when it attempts to register with the network.

Third, some IoT devices are constrained, so an automatic network capability configuration in the Core Network is desired to help those devices to dynamically configure network capability. Based on existing methods, dynamically adding or removing a network capability (i.e., updating the network slice to which the UE registers) will trigger a UE configuration update process, which further triggers the registration process, and sometimes requires the UE to enter IDLE mode and repeat the entire registration process. This should not be necessary and may be too complicated for a constrained IoT device.

Fourth, the scope of the existing SBA is limited to the control plane NFs. The user plane function (UPF) is not involved. UPF has some control functionalities, such as QoS enforcement and event monitoring. It is desired to define a service based interface and UPF services to enhance the SBA.

Fifth, when a UE sends registration request to the Core Network there is no way for the UE to indicate what network capabilities it requires.

Sixth, when a UE registers to the network, it receives an Allowed NSSAI. The UE does not know whether the allowed NSSAI is able to support the UE's required capabilities.

Seventh, when there is a change in UE context, for example when a UE moves from EPS to 5G, or there is a request from an AS, which may update the network capability of the slice (e.g. maximum data rate etc.), there may be a required change in PCC rules and network slice information (and hence, the change in NCP) about the UE. The PCF may be able to convey such change to the UE as a UE Policies update. UE Policies may need to be enhanced to incorporate NCPs. 5GS does not have a mechanism to deliver such enhanced UE Policies as to the UE.

Eighth, a network slice may have a limitation on how many PDU sessions it can handle at a time. When a UE attempts to establish a PDU session with a network slice and if the network slice's capability has attained its peak, it cannot address the UE's request. The 5G System does not currently handle this condition.

Ninth, another network capability may be handling a maximum number of UE registrations per network slice. When a UE attempts to register with the network slice and the network capability for maximum UE registration in a slice has attained its limit, it should not be able to register. Current 5GS does not address such a case.

When a UE application attempts to initiate a data flow (e.g. an IP data flow), the UE needs to make a determination of which Slice and Data Network to associate the flow with. The 5G system provides one way of solving this problem in URSP. A URSP rule can include application identifiers and thus instruct the UE on how to route traffic from a given application. A drawback of this approach is that the UE needs to be provisioned with application identifiers that match its installed applications. Another approach to determining which slice and data network to associate a flow with is to allow the UE to indicate the slice (S-NSSAI) and data network (DNN) that the flow should be associated with. A drawback to this approach is that the UE Application needs to be provisioned with an S-NSSAI and DNN and these parameters need to be recognizable to the network.

Disclosed herein are methods and apparatus to enable a network to indicate, to the UE, the Network Capabilities of the Slice and how those capabilities are configured in the slice. This information can be used by the UE in situations where UE Applications can indicate their required capabilities to the UE. The UE can then use this information during route selection (i.e. during evaluation of URSP, when determining what slice and PDU session to use for a data flow). Also disclosed are methods for a UE to indicate to the network what Network Capabilities it desires and their desired configuration, and the network can provide the UE with slice identifiers that can provide those capabilities in the desired configuration.

The concept of a Network Capability Profile (NCP) is introduced. An NCP lists the capabilities of a slice and how each capability is configured. Examples of network capabilities are provided hereinafter.

Disclosed hereinafter are technical solutions to the problems of the existing service based architecture and the corresponding NF framework. These solutions may enable more dynamic and flexible operation in the service based architecture, and may improve the programmability of the service based architecture for the end user (i.e., UE and AS). In order to make it easier for users (e.g., UE and AS) to configure the desired network capability(ies) and features through service-based interfaces and procedures, the following are described.

First, a new framework is described which includes a network capability layer. A UE and AS may dynamically request network capability(ies) (e.g., background data transfer, non-IP data delivery, maximum UE DL/UL data rates, maximum delay tolerance, maximum guaranteed DL throughput, group features, message delivery options etc.) to support their applications. In one implementation, the UE and AS may not need to have knowledge nor care about which network slice supports the requested network capability(ies), or if the serving network slice is able to support the requested network capability(ies). A Core Network entity may determine and configure a network slice that supports all the requested network capabilities.

Second, a mechanism is described by which the network may deliver network capability information, referred to herein as a Network Capability Profile (NCP) for a network slice, to the UE. A method in which a UE may be informed by the network about an alternative network slice with a comparable network capability profile based on the UE's requested network capability is also described.

Third, a method is disclosed for a UE to initiate a network capability based registration to configure its desired network capabilities.

Fourth, a method is described for a UE to initiate a network capability based registration to configure its desired network capabilities.

Fifth, a method is described for UEs to initiate a network capability based registration update when UEs are already registered to the network and want to dynamically re-configure their network capabilities.

Sixth, a method is described for a network capability based UE configuration update, which allows NFs or Application Servers to initiate the process to update the network capabilities in the network slice for the UE.

Seventh, a method is disclosed by which a UE can receive a set of Allowed NSSAIs with their corresponding NCPs during a general UE registration procedure. The UE may be able to request an alternative network slice based on the NCP list of allowed S-NSSAIs received from the core network, if the capabilities indicated by the received NCPs are insufficient for the applications in the UE.

Eighth, a method is disclosed by which NCP(s) for network slice(s) are delivered to the UE as a part of the UE Polices during UE Policies update procedure.

Ninth, a method is disclosed by which core network enforces the maximum number of PDU sessions per network slice and handles the requests that are received after the maximum limit has been attained during PDU Session Establishment procedure.

Tenth, a method is disclosed in which core network handles the maximum limit on number of PDU sessions per network slice in which network periodically informs the UE via NAS message that the network slice has attained its maximum limit so that UE can wait before re-attempting.

Eleventh, a method is disclosed by which a core network enforces the maximum number of UE registrations per network slice and handles the registration requests that are received after the maximum limit has been attained.

Twelfth, an extended service based architecture is described which includes interfaces with a User Plane Function (UPF) and services provided by the UPF.

In accordance with these aspects, a UE may send a network capability configuration request to configure network capability(ies) for supporting its applications, and the UE may receiving a network capability configuration response with the identity of the network slice that supports the desired network capabilities. Building on these features, the network entity receiving the request may perform one or more of the following operations:

check a network capability profile to determine if the serving network slice can support the requested network capability(ies);
select a new network slice to serve the UE for all the requested network capabilities;
initiate a new network slice (instance) to serve the UE with all the requested network capabilities in case the UE cannot be served by any existing network slices;
select a new entity that terminates the NAS signaling with the UE serving the newly selected network slice;
update the network capability profile of the selected network slice; and
send a response to the UE with information of the serving network slice and network capabilities.

The network capability profile may include one or more of:
an identifier of a network slice and corresponding network slice instances;
identifiers of a list of supported network capabilities;
an identifier of a serving PLMN; and
serving area information of each network capability.

The network capability configuration request may contain one or more of the following:
an identification of one or more desired network capabilities;
identifiers of applications which require the network capability(ies);
a NSSAI, which may be a configured NSSAI or an allowed NSSAI, that the UE was assigned during a previous registration process;
identifiers associated with the UE;
serving area information of the requested network capability(ies);
availability schedules for the required network capability(ies);
a QoS level (e.g. service response time) for the required network capability(ies);
a required level of multitenancy (e.g. how many applications on the UE will require use of the one or more network capabilities).

Further according to the foregoing aspects, a network entity may perform one or more of the following operations:
receive a network capability configuration request from a network entity which triggers a network capability configuration update process for a UE;
determine whether it is necessary to select a new network slice and/or a new network entity as the NAS signal termination point for the UE;
select a new network slice and/or a new NAS termination point for the UE;
send a configuration update message to the UE; and
send a response to the triggering network entity.

The network entity receiving the request may further perform one or more of the following:
check a network capability profile to determine if the serving network slice can support the requested network capability(ies);
select a new network slice to serve the UE for all the requested network capabilities;
select a new entity that terminates the NAS signaling with the UE serving the newly selected network slice;
update the network capability profile of the selected network slice; and
send notification to the UE with information of the serving network slice and network capabilities.

Alternatively, instead of a network entity triggering a network capability configuration update process for the UE, an application server may decide to trigger the process by sending a network capability configuration request.

The UE may perform one or more of the following:
Send a Registration Request.
Receive a Registration Response, the response includes an NCP for a Network Slice.

Further according to the foregoing aspects, one of more of the following operations may take place:
The Response may come from an AMF.
The AMF may obtain the NCPs for the subscribed S-NSSAIs from the UE
Subscription information in the UDM.
The AMF may obtain the NCPs for the allowed S-NSSAIs from another network function such as the UDM, NSSF or NRF.
The Response may contain S-NSSAIs that were not in the Registration Request and the response may include an NCP for each S-NSSAI.
The UE may request an alternative network slice based on the NCP list of S-NSSAIs received from the core network.
A UE may receive an NCP as part of UE Policies that are received in a NAS message.

Further according to the foregoing aspects, a network entity may perform one or more of the following operations:
Receive trigger to update the UE's NCP Policies.
Check latest PSIs to find out the UE policies and NCP policies (NCCP) for the S-NSSAIs to be sent to the UE.
Integrate NCPP with the UE Policies.
Deliver NCPP using UE Policy container to the UE.

Further according to the foregoing aspects, the UE may use the information in the NCPPs when selecting routes during evaluation of URSP rules. For example, the UE may choose to establish routes that are described in lower priority RSD's in situations where the maximum data rate in the slice that is associated with a higher priority route is lower.

The UE may perform one or more of the following:
Attempt to establish a PDU session with the network.
Get rejected and receive a cause code indicating that the maximum PDU sessions limit for the slice has been attained and a wait timer.
Not attempt PDU session establishment until wait timer expires or until the UE terminates a PDU session.

Further according to the foregoing aspects, a network entity may perform one or more of the following operations:
Employ a counter, which increments or decrements a count for every PDU session established or terminated.
Upon attaining a maximum limit, may block the UE's request to establish a PDU session and send a cause code to the UE as a response, where the cause code contains a reason for denying access with a wait timer.

The UE may perform one or more of the following:
Receive a NAS notification, which indicates that the maximum PDU session limit has been attained and a wait timer.
Wait for the wait timer to expire or wait until the UE terminates another PDU Session in the same slice, before requesting PDU session establishment.

Further according to the foregoing aspects, a network entity may perform one or more of the following operations:
Employ a counter, which increments or decrements a count for every PDU session established or terminated.
Notify the UE when the condition has been cleared.

Further according to the foregoing aspects, the UE may perform one or more of the following operations:
Receive a NAS message from the network, which indicates that the condition has been cleared.

Reset the wait timer and re-attempt PDU Session Establishment process.

Wait until the wait timer expires and re-attempt PDU Session Establishment process The UE may perform one or more of the following operations:

Request UE registration procedure.

Get rejected with a cause code, which indicated that the maximum UE registration limit has been attained and a wait timer.

Not request UE registration until wait timer expires or until some UE de-registers from the slice.

Further according to the foregoing aspects, a network entity may perform one or more of the following operations:

Employ a counter, which increments or decrements a count for every UE registered or de-registered.

Upon attaining a maximum limit, a network entity may block the UE's request to register and send a cause code to the UE as a response, where the cause code contains a reason for denying access with a wait timer.

Notify the UE that the condition has been cleared.

Further according to the foregoing aspects, the UE may perform one or more of the following operations:

Adhere to the wait timer.

Receive a NAS message from the network, which indicates that the condition has been cleared.

Reset the wait timer and re-attempt and attempt UE registration request.

Framework for Network Slicing in the 5g Core Network

Figure 7:
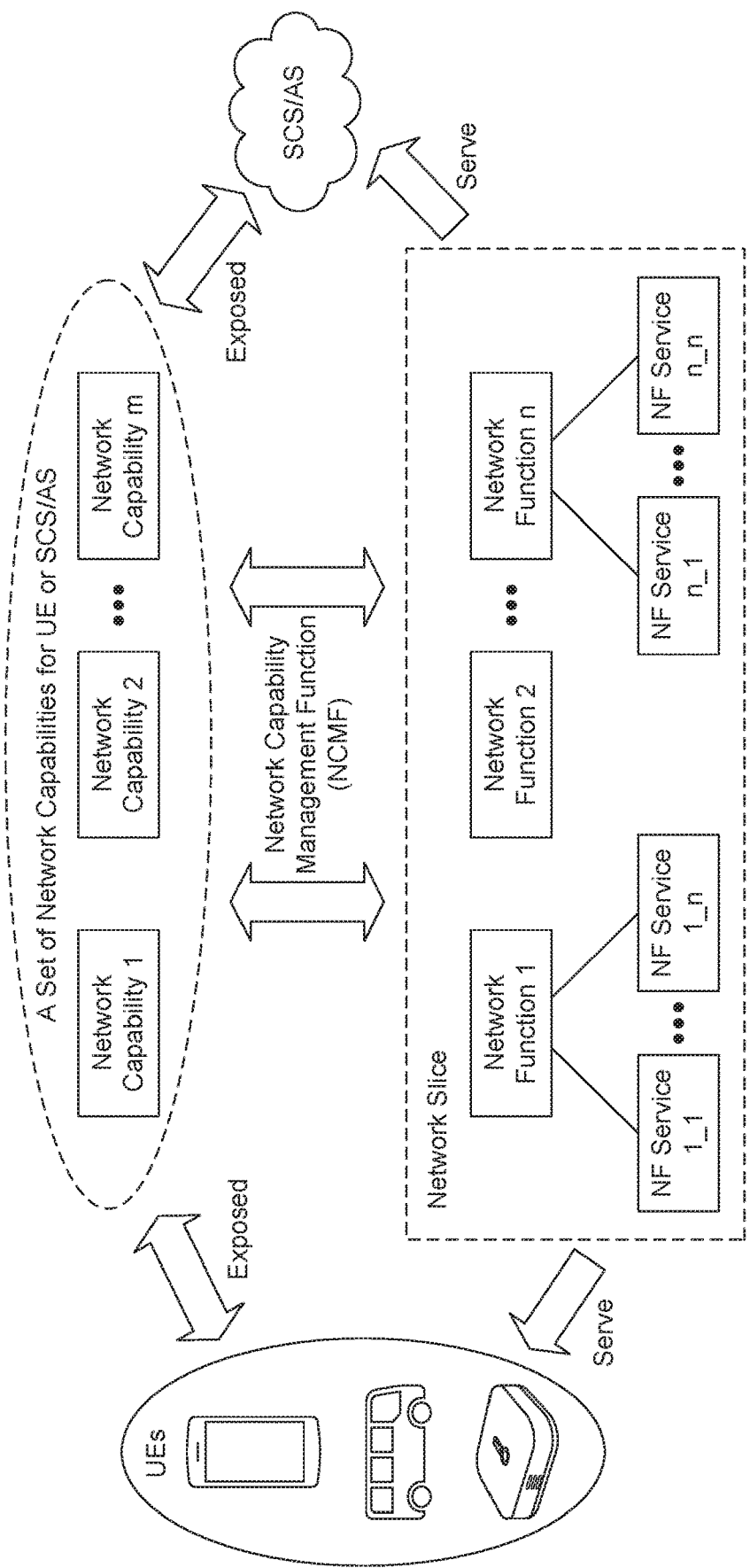
FIG. 7 shows an example network architecture with a network capability layer.

FIG. 7 shows a network architecture having a network capability (e.g., BDT, NIDD and event monitoring) layer between network slices (with corresponding NF and NF services) and UEs/ASs. The network capability layer may enable finer granularity of network slice configuration and an easier way for a UE/AS to configure their network features. The new layer may comprise a logic layer, which allows a UE and SCS/AS to request desired network capabilities by indicating what network capabilities (e.g., BDT, NIDD and event monitoring) are desired instead of, or in addition to, indicating what type of network slice is desired.

A UE/AS may send a request to the Core Network directly indicating desired network capabilities, and a new NF—referred to herein as a Network Capability Management Function (NCMF)—may operate to configure a network slice to serve the UE/AS with the desired network capabilities. The NCMF may implement the management functionality of the network capability layer in the Core Network.

This new NF may enable finer granularity for configuring network services. On one hand, a UE/AS may directly indicate what network capability(ies) (e.g., background data transfer, event monitoring, etc.) it wants without knowing available NFs and NF services. This allows a UE/AS to request specific capabilities without requiring the UE/AS to have knowledge of how the network slice provides the capability(ies). A UE and AS may only be interested in the level of network capabilities for their applications. On the other hand, Core Network entities may keep the operation in the level of NF and NF services without any change in the existing framework due to the request from a UE/AS in the level of network capability.

The NCMF may have one or all of the following functionalities.

First, the NCMF may manage and maintain information providing a mapping between network capabilities and NF services. That is, the mapping information may indicate a set of NFs and corresponding NF services required to support a network capability. This information may be used to determine whether a network slice is able to support a network capability given which NF and NF services are included in the network slice.

Second, the NCMF may manage and maintain a profile comprising information identifying a set of network capabilities that are supported by a network slice. This network capability profile information may be useful when a UE/AS requests to add or update a network capability for its applications.

Third, the NCMF may also interface with a network Operation and Management (O&M) system to obtain information about a network slice, NF, NF service, and/or network capability. The NCMF may also request the O&M system to manage the network slice, network slice instance, NF, and/or NF service to support a desired network capability(ies).

The NCMF may be a stand-alone network function, a logical function that resides in other network functions such as the AMF, SMF, or PCF, or a service that is offered by a network function.

Mapping Information between Network Capability and NF Service

To determine whether a network slice is able to support a certain network capability, it is necessary to maintain mapping information to indicate what NF services are required to support a network capability. For example, the background data transfer (BDT) capability requires the Npcf_BDTPolicyControl service provided by the PCF, and the Nnef_BDTPNegotiation service provided by a NEF for determining a BDT policy. Moreover, the Nsmf_PDUSession service provided by the SMF is required to manage the PDU session for future data transfer. Table 3 shows one example of a data structure for providing the mapping information between a network capability and its required NF services.

TABLE 3

Mapping Information between Network Capability and NF Service

| Field | Description |
|---|---|
| Network Capability ID | Identify a network capability. In order to identify each network capability, operator may assign an ID to each network capability. |
| Required NF Services | Indicates one or more NF services required to support the network capability. |
| Required NF type | Indicates what type of NF is needed to implement the identified network capability, e.g., AMF, PCF. |

The NCMF may obtain the mapping information from the network's O&M system. The mapping information may be managed and stored at the NCMF. The NCMF may be co-located with a NSSF or NRF, so the above mapping information may be managed and stored in the NSSF or NRF as well.

Network Capability Profile

A network capability profile may comprise an information profile for each network slice maintained by the NCMF, which indicates what network capabilities are supported by each network slice. Table 4 shows one example of the information fields that may be included in a network capability profile for a given network slice. Note that Network Capability Profile (NCP) is a set of per slice information elements.

TABLE 4

Network Capability Profile

| Field | Description |
| --- | --- |
| S-NSSAI | identifier of a network slice |
| List of network capabilities | a list of one or more network capabilities that are supported by the network slice identified by the S-NSSAI and NSI ID. This may include but not limited to network slice's coverage area (Global, National, Regional, cellular, sectors, base station), delay tolerance capability, guaranteed DL throughput, location based message delivery, prediction frequency, periodic traffic, supported SSC modes, tunneling mechanism (L2TP tunnel, GRE Tunnel, VPN tunnel or Label based routing), group information etc. Further examples of Network Capabilities are listed later in this document. |
| PLMN ID | indicates the network in which the network slice instance is deployed |
| NF instances | indicates NF instances deployed in the network slice |
| NF service instances | indicates NF service instances implemented by the NF instance deployed in the network slice |
| NF types | indicates the types of NF that are available in this network slice |
| List of Applications that are Supported in the Slice Information per network capability | Indicates information about Applications that can use the slice (e.g. app IDs, manufacturer IDs, application type etc.). This information may be configured at the CN and optionally provided to the UE. |
| NSI ID | identifier of the network slice instance to support this network capability |
| Parameters of network capability | provides more details and meta data of the network capability. For example, regarding event monitoring, this may specify what types of events are enabled for the event monitor feature. Regarding background data transfer, this may include a list of parameters for BDT, such as number of UEs, and volume restriction per UE. Regarding Maximum UL and DL Data Rates, this field provides the Maximum UP and DL Data Rates. Regarding the "Support Radio Access Technologies" attribute, this field might indicate what RAT(s) (e.g. LTE, CAT-M, NR, non-3GPP, GERAN, UTRAN, E-UTRA, LTE-M, NB-IoT, Wi-Fi, Bluetooth etc. and Fixed access like DSL, Fiber etc.) may be used to access the slice or are desired to be used to access the slice. Regarding the "Positioning Support" attribute, this field may indicate the positioning methods that are supported in the slice. Regarding the "Simultaneous use of the network slice" attribute, this field can indicate what other slices can, or cannot, be used with the slice. Regarding the "Slice quality of service parameters" attribute, this field may indicate a 5QI value that is supported in the slice. Regarding the "Supported device velocity" attribute, this field may indicate a range or top speed that is supported for devices that connect to the slice. Regarding the "User Data Access" attribute, this field may indicate whether direct internet access, termination in the private network, or local traffic only is supported. Regarding the "V2X Communication mode" attribute, this field may indicate whether NR, E-UTRA, or both are supported. Regarding the "Maximum Supported Packet Size by the slice" attribute, the field may indicate a supported maximum transmission unit (MTU) important for URLLC (Ultra-Reliable Low Latency Communication) or MIoT (Massive IoT) and UE may need to be compliant with this packet size |
| Area information | Indicates in which area the network capability is provided, which may be different from the serving area of the network slice. For example, this may be in terms of a tracking area, registration area or geographic area. |

The NCMF may manage and maintain the information shown in Table 3 and Table 4. When the Core Network NF receives a request from a UE/AS for adding a network capability or updating a network capability (for example, modifying one or more parameters of the network capability), the request may be forwarded to the NCMF to determine whether the serving network slice already supports the requested network capability. If not, the NCMF may further determine whether the serving network slice can be configured to support the requested network capability. That is, whether the serving slice is able functionally to be configured to support the network capability, and whether the serving slice has enough resources (e.g., available processor and memory resources) to be configured to support the network capability.

Optionally, the information in Tables 3 and 4 may instead or in addition be managed and maintained at a NSSF or NRF, in which case that NCMF may co-locate with the NSSF or NRF, where NF and NF service information is maintained.

Another alternative is to store this information in the UDR. This may provide an easier way for any NF to obtain this information by accessing data storage, without discovering and communicating with the NCMF, NSSF or NRF.

As another alternative, the network capability profile may be implemented as an embodiment of the Slice Differentiator (SD) in a S-NSSAI, so that it is possible to indicate what network capabilities a network slice supports. This may allow to differentiate the network slices with the same Slice/Service Type (SST) (e.g., MIoT, eMBB) value of a network slice, but supporting different network capabilities.

At the UE/AS side, once the registration or registration update procedure is completed, the UE/AS may keep the information about what network capabilities are supported by the serving network slice. Moreover, the UE/AS may keep the information about which network capability(ies) supported by a network slice is for which application, since there may be multiple network slices serving different applications running on a UE.

Network Slice Capability Configuration

The Network Capability Profile of Table 4 includes a Network Slice Capability field for each Network Slice Capability that is supported by the slice. This field indicates the specific capability that is supported by the slice. Examples of a capability that might be supported by a slice are listed below; support for these capabilities may be indicated by the network to the UE:

Maximum number of UEs per network slices
Maximum number of PDU sessions per Network Slices
Maximum UL and DL data rate per UE in the Network Slice
Support for Deterministic Communication
Support for Group Communication
Support for an Indicated Isolation Level
Support for location-based message delivery
Support for a maximum packet size Support for mission critical communication
Support for MMTel
Support for performance monitoring
Support for an indicated Session and Service Continuity (SSC) mode
Support of non-IP data delivery (NIDD) and/or reliable data service (RDS)
Support for certain RATs
Support for a specific device velocity
Support for a specific vertical application, such as V2X communications and mIoT communication
Support for a specific service area, where only those UEs that are located within the service area are allowed to access/connect to the network slice. The service area could be in terms of tracking area, registration area, or geographic area.
Maximum number of network slice instances that can be instantiated for a network slice.
Support for certain relay mechanisms
Support for multiple tunneling mechanisms (L2TP tunnel, GRE Tunnel or VPN tunnel).
Support for network slices' coverage area (Global, national, regional, limited to cell, sectors, base station etc.)
Support for Delay Tolerance about UE.
Support for Guaranteed DL throughput for UE.
Support for Prediction Frequency that describes how often KQI and KPI prediction values are provided to the UE. UE may send request and receive prediction information in advance about quality drop (and hence switch of slice if needed.)
SSC mode support (SSC mode 1, SSC mode 2, SSC mode 3, SSC mode 4)
Support Periodic traffic (deterministic communication) that can help optimize scheduling/performance for UE.
Support for multiple radio spectrum as some terminals might be restricted in terms of frequencies to be used (e.g. n1, n77, n38 etc.).
Support for various access technologies.
Support for Uplink throughput per network slice, which defines the achievable data rate of the network slice instance in uplink that is available ubiquitously across the coverage area of the network slice.
Support for user data access, which defines how the network slice (or mobile network) should handle the user data. For instance, a UE may have access to the internet, data may be routed to private network via tunneling or all UE data may stay local. Support for slice quality of service parameters which defines all the QoS relevant parameters supported by the network slice.
Support for maximum supported packet size by the slice which may be important for URLLC (Ultra-Reliable Low Latency Communication) and MIoT (Massive IoT), or to indicate a supported maximum transmission unit (MTU). Hence, UE may need to be compliant with this slice.
Support for network slice isolation level (Physical or logical isolation). This may impact or support UEs to be isolated based on slice.

Note that some of the capabilities listed above may require additional configuration. For example, the "Support for Guaranteed DL throughput for UE" capability may be associated with a specific DL thought value (e.g. 100 Mbps). This information will be captured in the "Parameters of network capability" field of Table 4. The "Parameters of network capability" may be indicated by the network to the UE.

Network Capability-Based Registration

With the network capability layer of FIG. 7, which may be implemented in the form of the NCMF, a UE is able to request its desired network capabilities, and a UE does not need to know whether a specific NF and NF services are available at a network slice.

Figure 8:
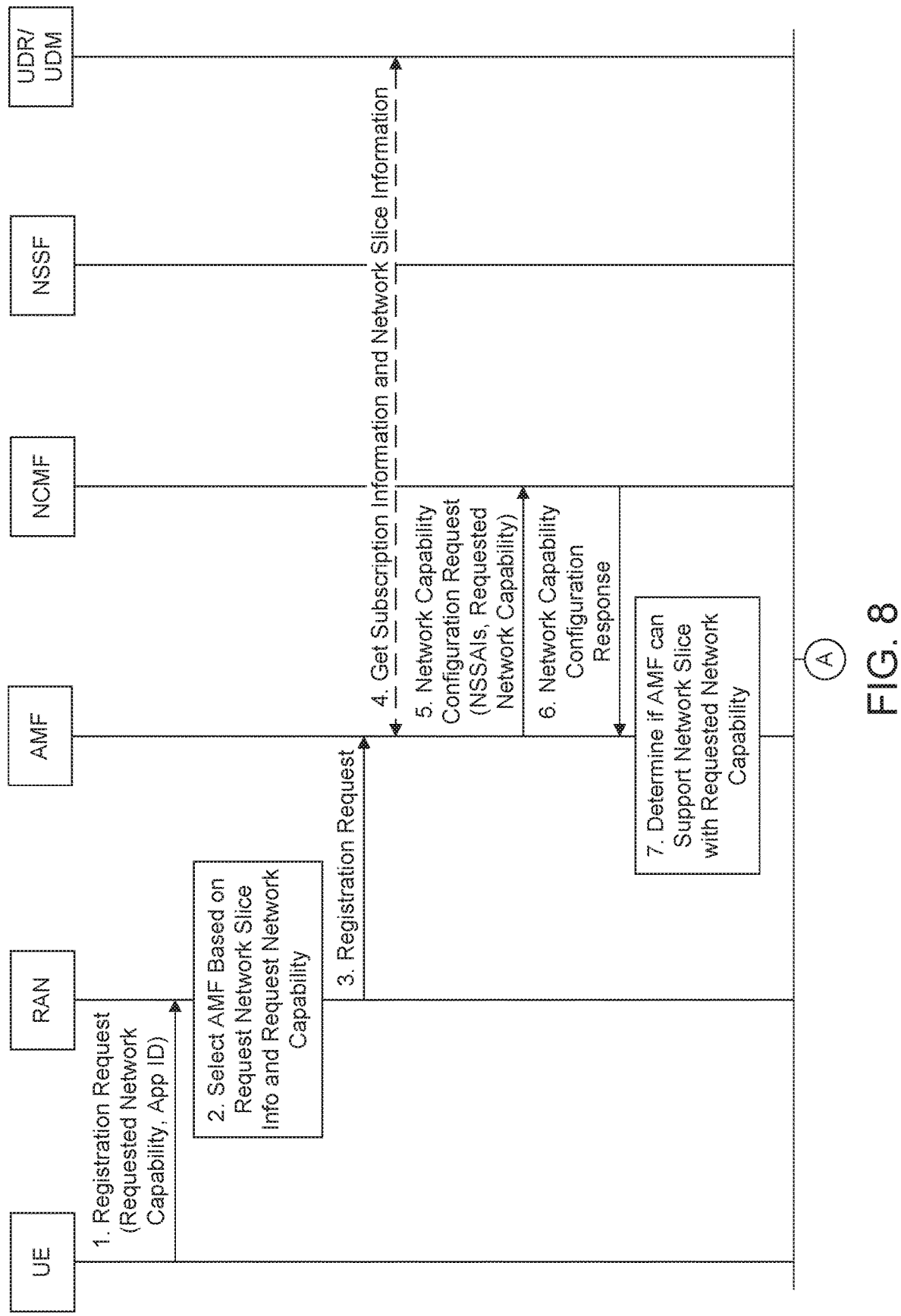
FIG. 8 shows a method for network capability-based registration.
Figure 8:
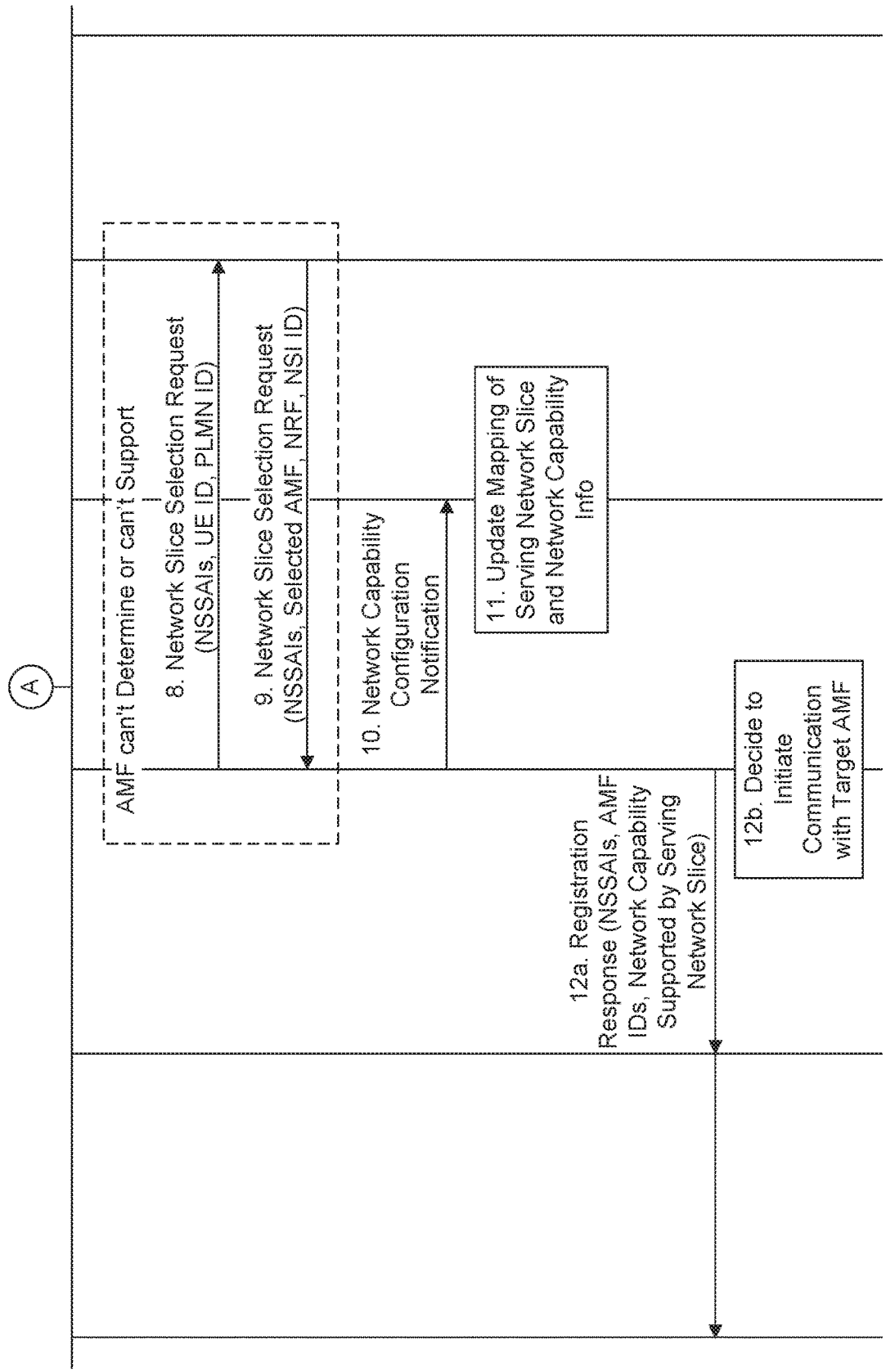

FIG. 8 shows one example of a method for network capability-based registration. When a UE registers, the UE may include an indication of a set of desired network capabilities to support its applications, and the network may reply with a NSSAI and NSI ID that identify a network slice supporting all the requested network capabilities. The network's response may also indicate which S-NSSAI's are associated with each capability. The steps of the registration method are shown in FIG. 8. Note that, for description purposes only, only information related to network capability configuration is described below. In the registration procedure, other information is involved such as information related to mobility management, session management, etc.

In step 1, the UE may send a registration request message to a RAN node of a communications network. In the request message, the UE may indicate the following information:

A list of requested network capabilities, each of which is identified by a network capability identifier (ID). This information may be captured in a Network Capability Profile as described in Table 4. The information may be associated with the Request NSSAI and one Network Capability Profile may be provided per S-NSSAI in the NSSAI. When the UE initiates the registration for the first time, it may not have the network capability mapping information. The UE may insert some requirements of the network capabilities, so that the network entity (e.g., AMF, NCMF) can determine if the existing network slice is able the serve the UE based on these requirements. Some requirements are discussed below, such as required network capability availability schedule, required network capability QoS level, and required level of multitenancy. The UE can determine types of requested network capabilities based on the types of applications which are running on the UE. One application may require multiple network capabilities. Consequently, the UE may need to maintain some information about which applications need what network capability(ies) in the 5G core network. The UE may obtain this information through application level signaling when communicating with the AS.

Previous NSSAI: if available, the UE may include one or more S-NSSAIs that it was assigned if the UE registered to the PLMN previously. This may help the RAN node to select an AMF, and may be used by the AMF to configure/select a network slice supporting the requested network capabilities. The included NSSAI may be a configured NSSAI or an allowed NSSAI provided to the UE in a previous registration process. This parameter is optional.

Application IDs: indicate a set of applications that are requesting the requested network capabilities. It is possible that the UE is served by multiple network slices, and each network slice may serve a different set of applications, such as mIoT and eMBB. Correspondingly, the applications and network capabilities may be divided and supported by different network slices. Therefore, the UE may maintain the information indicating which application is served by which network slice with a set of network capabilities. It is possible that a network capability is supported by more than one of the network slices, which serve different applications in the UE. Alternatively, the UE may provide Application IDs without binding them to any network capability, and an SCS/AS will be contacted to determine which application is associated with which network capability. This may reduce the UE's responsibility, and may be useful for constrained devices.

PLMN ID: this indicates the PLMN to which the UE intends to register, if the UE has this information. Since different PLMNs may configure different network slices to provide the same network capability, the PLMN ID may facilitate network slice and AMF selection.

UE identifiers such as GUTI and/or SUPI, if available.

Area information: used to select a network slice to serve the UE. This information may be in the form of TAI, registration area or geographic area.

Required network capability availability schedule.

Required network capability QoS level (e.g. service response time).

Required level of multitenancy (e.g. how many applications on the UE will require use of network capability (ies)). This information along with above network capability requirements can be useful for a network O&M system to determine whether existing slice instance(s), NFs, and NF services can be used to satisfy the request for network capabilities or if new instances need to be instantiated (e.g. based on availability and scalability requirements).

In step 2, upon receiving the registration request, the RAN node may select an AMF based on the requested network capabilities as well as the following information:

NSSAI and AMF association information which indicate which AMF serves which network slice identified by the NSSAI; and mapping information of network capability and S-NSSAI.

The RAN node may obtain the above information by the AMF sending it to the RAN node by appending the above information in a N2 message. Alternatively, the RAN node may obtain the above information by the Core Network periodically sending the RAN node the above information to advertise its network slice information and supported network capability information.

If the RAN node does not have any of the above information, or does not know any AMF supporting the requested network capability(ies), the RAN node may select a default AMF based on its local configuration. In this case, another AMF may be selected later to serve the UE.

In step 3, the RAN node may forward the registration request to the selected AMF.

In step 4, the AMF may choose to contact a UDM to retrieve some subscription information, and/or a UDR to obtain some UE context information as well as network capability information.

In step 5, the AMF then queries the NCMF to obtain the information about which network slice(s) can support the requested network capability(ies) and network capability usage requirements of the UE, such as the required network capability availability schedule, required network capability QoS level, and required level of multitenancy as discussed above. The AMF may include the requested network capability information in the message. Alternatively, the AMF may query the NCMF to check if the S-NSSAI's in the Requested NSSAI can provide the capabilities that were indicated in the Network Capability Profiles of step 1.

In step 6, the NCMF may check the mapping information of existing network slices and the network capabilities, and may return the NSSAI to the AMF to identify network slices that support all the requested network capabilities. If the NCMF cannot identify any existing network slice that is able to support all the requested network capabilities, the NCMF may indicate this in the response message. The NCMF may provide the AMF with a new set of S-NSSAI(s) that the UE can use to obtain the requested services. The NCMF may provide the AMF with a NSID's for each S-NSSAI. The NCMF may provide the AMF with a Network Capability Profile for each S-NSSAI.

In step 7, the AMF may compare the received NSSAI and locally stored network slice information to decide if the AMF can serve all the NSSAI required for all the requested network capabilities. If the AMF is able to do so, the AMF will update the UE context and perform step 10. Otherwise, the AMF may request the NSSF to perform network slice selection and proceed to steps 8 and 9 for any of the following cases: (1) the AMF is not able the serve all the NSSAI; (2) the AMF cannot decide whether it can serve the NSSAI; or (3) the NCMF indicates no existing network slice can support all the requested network capabilities.

In step 8, the AMF requests the NSSF to select a network slice instance by providing requested network capability information, PLMN ID as well as UE information if available, such as 5G-GUTI capabilities and SUPI.

In step 9, based on the UE ID and PLMN ID, the NSSF may verify the NSSAI in the request, and may select a network slice instance to serve the UE for all the requested network capabilities. If a new AMF set is selected to serve the network slice, the NSSF may also select a NRF so that the new AMF can select an NF instance and an NF service instance within the selected network slice. The NSSF may return the one or all of the following information in the response:

NSSAI;

selected NSI ID corresponding to the NSSAI in the request;

NRF address; and selected AMF set and/or AMF address.

In case the existing network slices cannot serve the UE, the NSSF may contact an Operation and Management (O&M) system to initiate a new network slice and corresponding network slice instance to serve the UE.

In step 10, once receiving the response, the AMF may notify the NCMF about the mapping information between the selected network slice and network capability(ies). This is necessary for cases in which the NCMF does not find any network slice supporting all the requested network capabilities—for example, in step 7.

In step 11, the NCMF may update the mapping information between the selected network slice and network capability(ies).

In step 12a, if the current AMF is able the serve the UE, the AMF may send the registration response to the RAN node, which forwards the response to the UE. The N2 message from the AMF to the RAN node may contain a network capability profile of the selected network slice, i.e., the selected network slice information as well as all the information concerning the network capability(ies) supported by the network slice. In addition, location information or registration area information may be contained in the response and provided to the RAN node and the UE, so that the information can be mapped or associated with the selected network slice.

The Registration Accept message may include a network capability profile for each S-NSSAI in the allowed NSSAI. The network capability profile is an indication or description about the capabilities of a network slice. Table 4 lists the contents of a network capability profile of a network slice.

In case that a UE is served by multiple network slices, the UE may maintain information identifying which application is served by which network slice instance with what network capabilities.

If the network slice is not able to support the UE requested capabilities then the AMF may send a reject message that includes an Error/Cause Code, which indicates reasons behind the failure to support the request.

Alternatively, the network may send to the UE, the network capability profile(s) for network slices that closely match the requested network capability profile(s). For instance, if the UE asked for guaranteed DL throughput network capability with 10 Gbps the network may be able to scan the matching network capability profile(s) for available network slices and if the best available network capability for guaranteed DL throughput is 8 Gbps, the network may send the network capability profile(s) to the UE to indicate if it can accept the network capabilities profile(s) and agree to register with a network slice. On the other hand, the network capability profile of a slice may offer more network capabilities and/or better service quality (e.g. average UE UL/DL data rate, average latency etc.) than UE desires.

If the network sends a counter network capability profile(s) to the UE, the UE may either reject or accept the offered network capability profile.
- If the UE accepts the offered network capability profile(s), the UE may send an acknowledgment to the AMF, indicating acceptance.
- If the UE rejects the offered network capability profile(s), it may do that by sending a Reject Message (a reject code) to the AMF. In this case, the AMF may reply with a default network slice and its network capability profile.

Alternatively, if the requested network capabilities are not available, the network may grant the UE a default slice's NCP that has standard network capabilities.

In step 12b, if a new AMF is selected to serve the UE, the current AMF may initiate a AMF relocation process by contacting the target AMF, per the procedure described in 3GPP TS 23.502, Procedures for the 5G System; Stage 2, v 15.1.0, Release 15, 2018-0.

In general, the network capability request information delivered in step 1 may be encapsulated in any NAS message, such as NAS-MM signaling between the UE and the AMF, or the NAS-SM between the UE and the SMF. In this sense, the information may be encapsulated in the service request message as well as the session management related request message. A UE may include the network capability request in a NAS-SM message. For example, a UE may start a new application that needs to use network capabilities X, Y and Z. The UE may already be registered and have PDU sessions on a network slice. The UE may issue a PDU session establishment request with an indication to start a new PDU session on the same network slice that supports network capabilities X, Y and Z. The AMF or SMF may trigger the exchange with the NCMF to see if slice 1 is sufficient or if there needs to be a new slice for this PDU session.

Network Capability Based Registration Update

Figure 9:
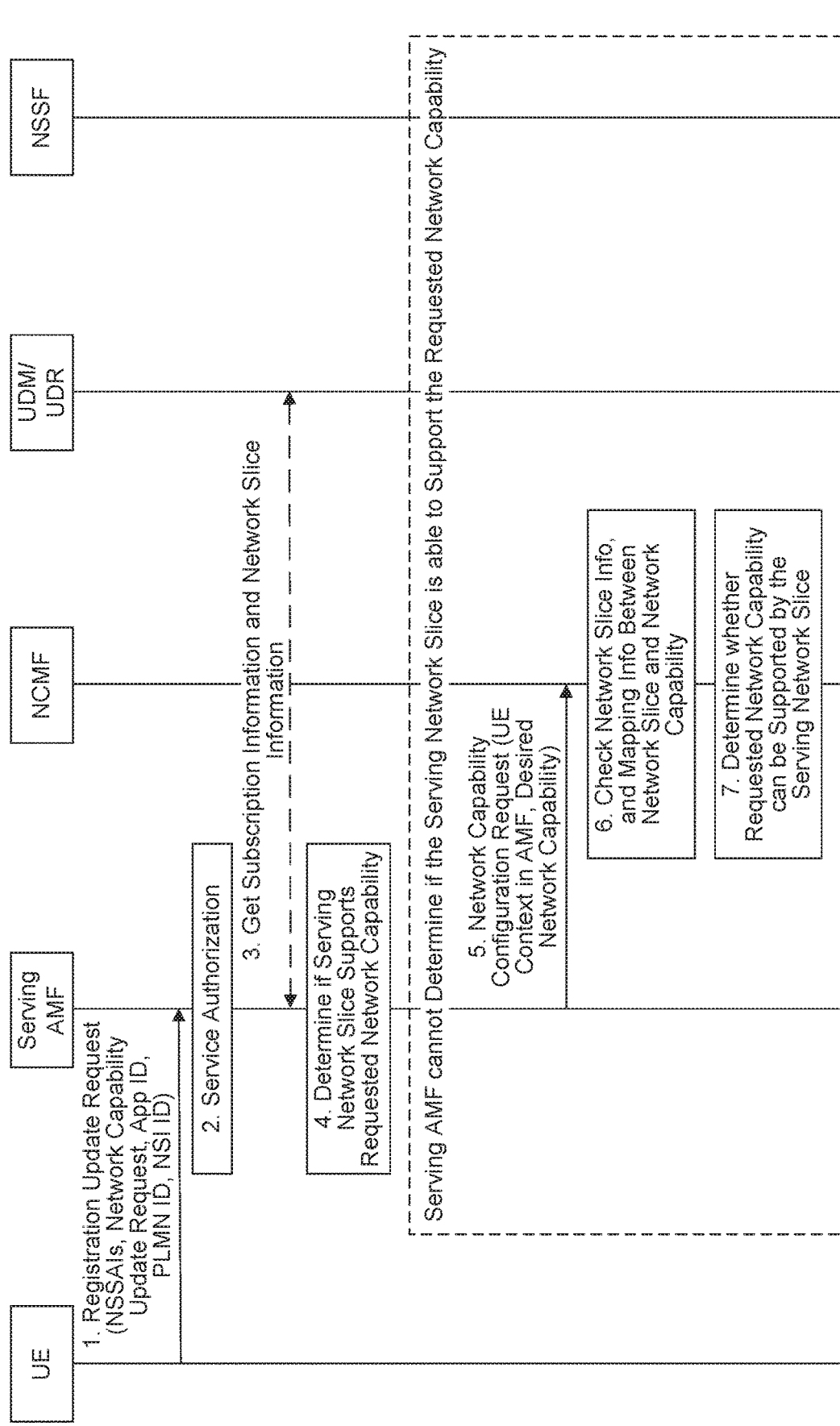
FIG. 9 shows a method for network capability-based registration update.
Figure 9:
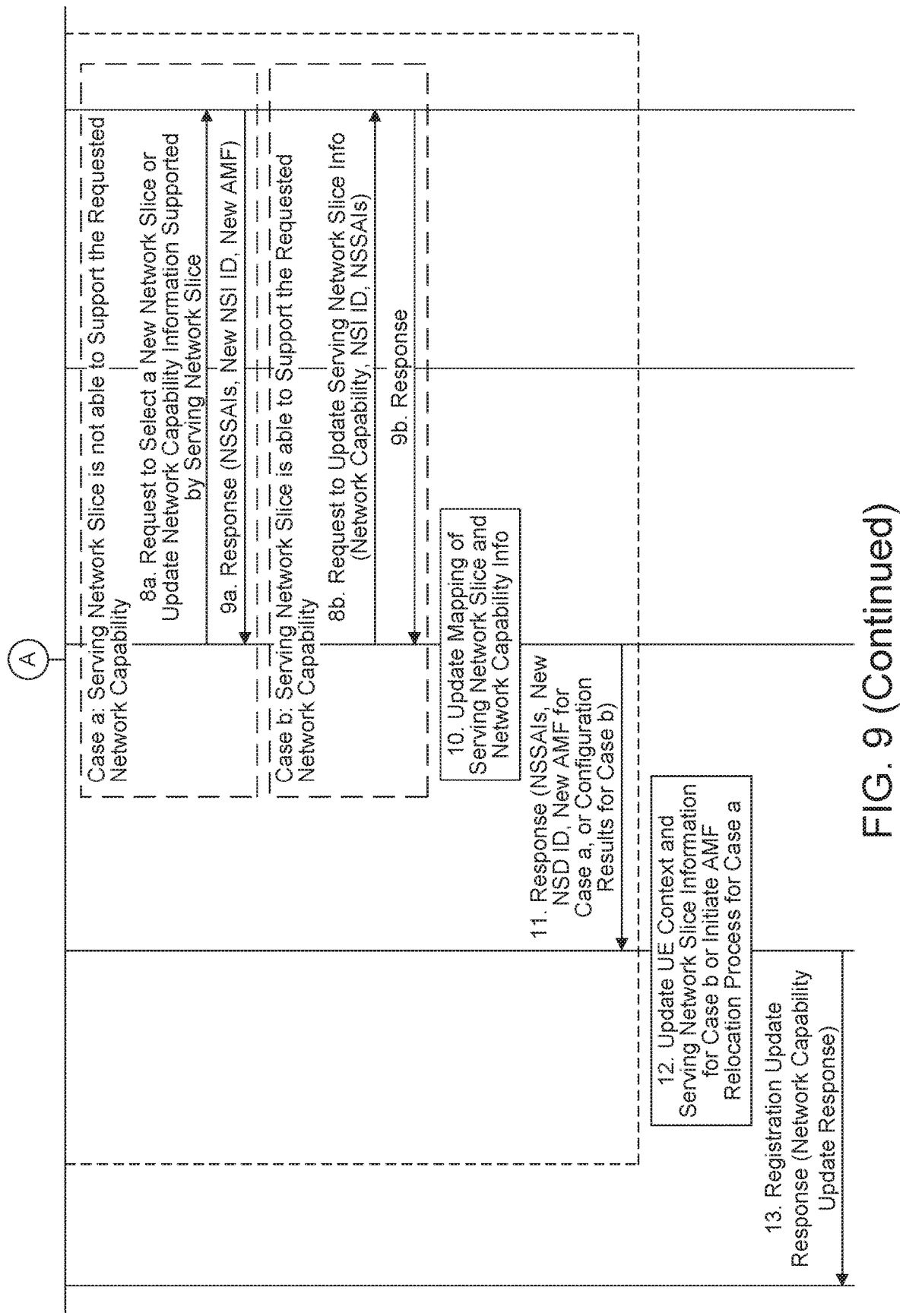

A UE may ask for a new network capability even after the registration is completed, and the UE is served by a network slice. For example, a new IoT application may start in the UE, and requires a NIDD feature which is not supported by the serving network slice. FIG. 9 shows one example of a method for UE-initiated network capability-based registration update.

The network capability information that is provided in step 1 may be considered an NCP.

In step 1, the UE may initiate the registration update process with a registration update request message, which may include one or all of the following information:
NSSAI: this is the configured NSSAI and/or allowed NSSAI the UE obtained during a previous registration process;
PLMN ID: this is used to indicate the PLMN where the UE is served by the network slice;
NSI ID: this indicates the network slice instance that is serving the UE
Application ID: this is an identifier of the application on the UE for which the new network capability is needed;
Requested network capability: the UE may determine types of requested network capability(ies) based on the type of new application, which starts running on the UE. One application may require multiple network capabilities.
Information related to the network capability usage requirements of the UE such as required network capability availability schedule, required network capability QoS level (e.g. service response time, etc.) and required level of multitenancy (e.g. how many Apps on the UE will require use of network capability).
Required network capability availability schedule
Required network capability QoS level (e.g. service response time)
Required level of multitenancy (e.g. how many Apps on the UE will require use of network capability). This information along with above network capability requirements can be useful for a network O&M system to determine whether the existing slice instance(s), NFs, NF services can be used to satisfy the request or if new instances need to be instantiated (e.g. based on availability and scalability requirements).

In step 2, the serving AMF may verify whether the UE is allowed to ask for the new network capability(ies), and the information provided by UE is valid.

In step 3, the serving AMF may optionally choose to contact a UDM/UDR to retrieve some more information about the UE and UE context in the UDR.

In step 4, the serving AMF may decide if the new requested network capability(ies) can be supported by any network slice which the AMF serves. If the serving AMF can support the requested network capability, regardless if this is by the serving network slice or a different network slice, the AMF will perform step 12.

In step 5, in case that the serving AMF is not able to support the required network capability and network capability usage requirements of the UE, or in case the serving AMF cannot decide if it is able to support it, the serving AMF may send a network capability configuration request to the NCMF including the UE context stored in AMF, the NSSAI, and the required network capability information.

In step 6, upon receiving the request, the NCMF may check the mapping information between available network slices and their network capabilities, as well as the network capability profile, to find a network slice that supports the requested network capability(ies).

In step 7, the NCMF may then determine whether the requested network capability(ies) can be supported by any network slice without changing the serving AMF.

In step 8a, in case the NCMF determines that the serving network slice is not able to support the network capability requested by the UE, it will request the NSSF to select a new network slice.

In step 9a, the NSSF may select one or more network slice instances, potentially a new AMF set, and an NRF. The NSSF may return any selection results, including the NSI ID, NSSAI, NRF address, and the AMF set. If a new AMF is selected, a AMF re-location process may be triggered at step 12b. If a new network slice is selected without change of AMF, the UE may connect to both network slices simultaneously. In case that the existing network slices cannot serve the UE, the NSSF may contact an Operation and Management (O&M) system to initiate a new network slice and corresponding network slice instance to serve the UE.

In step 8b, in case the NCMF determines that the serving network slice can support the network capability requested by the UE, while the network capability is not enabled yet, the NCMF may send a request to the NSSF to update the serving network slice information to indicate that the network slice is going to support the network capability. The NCMF may include in the request message the requested network capability information, the NSI ID that is serving the UE, and the NSSAI which AMF is serving.

In step 9b, the NSSF may update the network slice information, and may reply to the NCMF to confirm.

In step 10, the NCMF may also update the mapping information to indicate that the network slice is supporting the network capability requested by the UE.

In step 11, the NCMF may sends a response to the serving AMF with the all or some of the following information:
  NSSAI;
  New NSI ID for the case "a" that a new network slice is selected;
  New AMF set for the case "a" that a new network slice is selected; and
  Configuration results for the case "b" that the serving AMF and serving network slice is able to support the network capability.

In step 12, the serving AMF may update the UE context and serving network slice information for case "b", or may initiate the procedure to relocate the AMF for case "a".

In step 13, the serving AMF may reply to the UE with a registration update response to indicate the serving network slice information if the serving AMF is not changed. If a new AMF is selected by the NSSF, the target AMF may contact to confirm the registration update with the new network capability enabled.

Network Capability Based UE Configuration Update

In addition to the UE, the network or an AS may also initiate an update of the UE configuration due to a network capabilities update in the serving network slice. For example, the following events may trigger the network or an AS to start the process:
  A new application starts in the SCS/AS, and the UE subscribes to a new application service at the SCS/AS. As a result, a new network capability is required to support the new application.
  The network wants to switch to a new network slice to serve the UE due to some reasons, such as a load balance issue or scale down of network function/network slice instance in the serving network slice.

Figure 10:
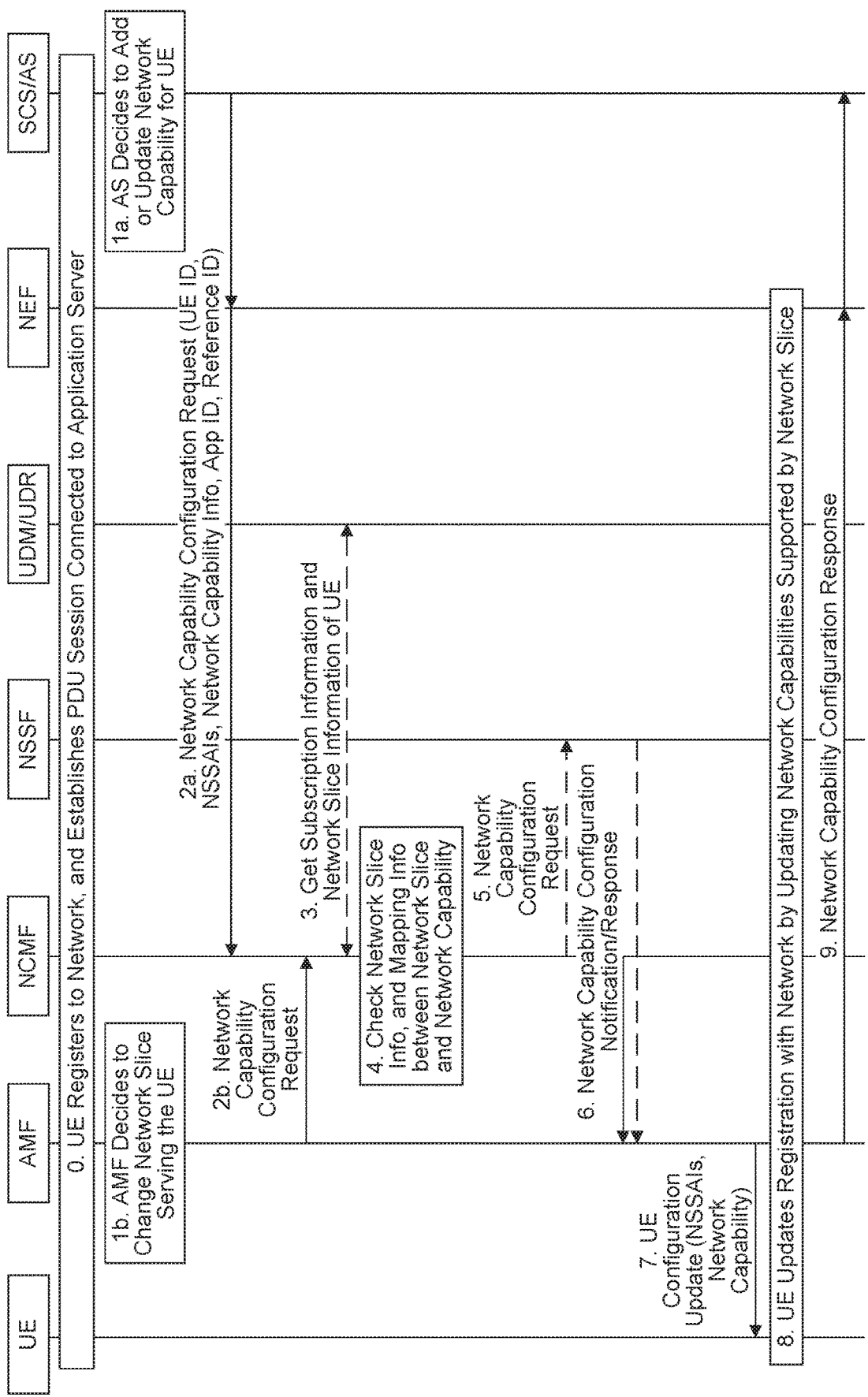
FIG. 10 shows a method for network capability-based UE configuration update.

FIG. 10 shows a method for network capability-based UE configuration update:

In step 0, this is a pre-requisite step assuming that the UE completes the registration with the network, and the UE has the connection to the application server (AS) through the network.

In step 1a, the AS may decide to add or update the network capability in a network slice serving the UE due to a certain event, such as new application session is required. In the case of a new application, the AS can determine types of requested network capability(ies) based on the type of new application.

In step 1b, the AMF decides to change the network slice serving the UE due to some reason, such as the load balance of the serving network slice.

In step 2a, the AS sends a network capability configuration request message to the NCMF via the NEF. The information that is provided in this step may be an NCP and the following information may be included:
  UE ID such as SUPI, GUTI or external UE ID;
  NSSAI, which indicates the serving network slice for the connection between the UE and the AS;
  New network capability information to be added into the network slice for supporting the communication between UE and AS;
  Information related to the network capability usage requirements for communication between the UE and the AS such as a required network capability availability schedule, a required network capability QoS level (e.g. service response time, etc.) and a required level of multitenancy (e.g. how many applications on the UE or AS will require use of the requested network capability (ies));
  Application ID, which indicates the application associated with the requested network capability(ies);
  Reference ID, which is used to refer to this network capability configuration process; this may be assigned by the NEF; and
  NSI ID: indicates the network slice instances that are serving the UE.

In step 2b, the AMF sends the network capability configuration request message to the NCMF.

In step 3, once receiving the request, the NCMF may optionally choose to contact the UDM/UDR to retrieve some more subscription information of the UE and UE context in the UDR.

In step 4, the NCMF may check the network slice information, and the requested network capability information. The purpose of these checks is to:
  Verify the information provided by AS or network functions, such as network slice information, network slice instance information; and
  Decide whether the serving network slice is able to support the requested network capability and network capability usage requirements of the UE and AS. This can be done by checking the network capability profile of the network slice. If not, step 5 will be performed.

In step 5, in case the NCMF finds out the serving network slice cannot support the requested network capability(ies), the NCMF may resort to the NSSF to select a new network slice or formulate a new network slice. It is also possible that the NCMF finds the serving network slice is overloaded, and if so, it may request the NSSF to select a new slice.

In step 6, either the NCMF or the NSSF notifies the AMF to proceed with the network configuration process. If the process is triggered by the AS (i.e., step 1a and 2a), the AMF will be provided the UE ID, NSSAI, NSI ID, SCS/AS ID, NEF ID and reference ID. This information may be used by the AMF to contact NEF later.

In step 7, the AMF communicates with the UE to trigger the UE configuration update. In the message, the AMF will notify the UE with an NCP for the slice which includes one or more of the following information:

New network capability information;
NSSAI identifying the network slice, especially for the case that a new network slice is selected;
Reference ID; and
SCS/AS ID.

In step 8, the UE initiates the registration update process, which is presented in FIG. 9.

In step 9, once the registration update process is complete, the AMF sends the message to reply to the AS via the NEF for the case that the AS initiates the process.

Note that FIG. 10 shows the scenario that the AMF starts the process as an example of a network entity initiating the process. It is also possible that other network entities initiate the process. For example, the PCF may initiate the process due to a UE policy change or a network slice selection policy change. Therefore, the PCF may trigger a network slice selection process, which potentially may affect the network capability provisioning for the UE.

Registration Procedure with Network Capability Profile for Requested NSSAI

Figure 13:
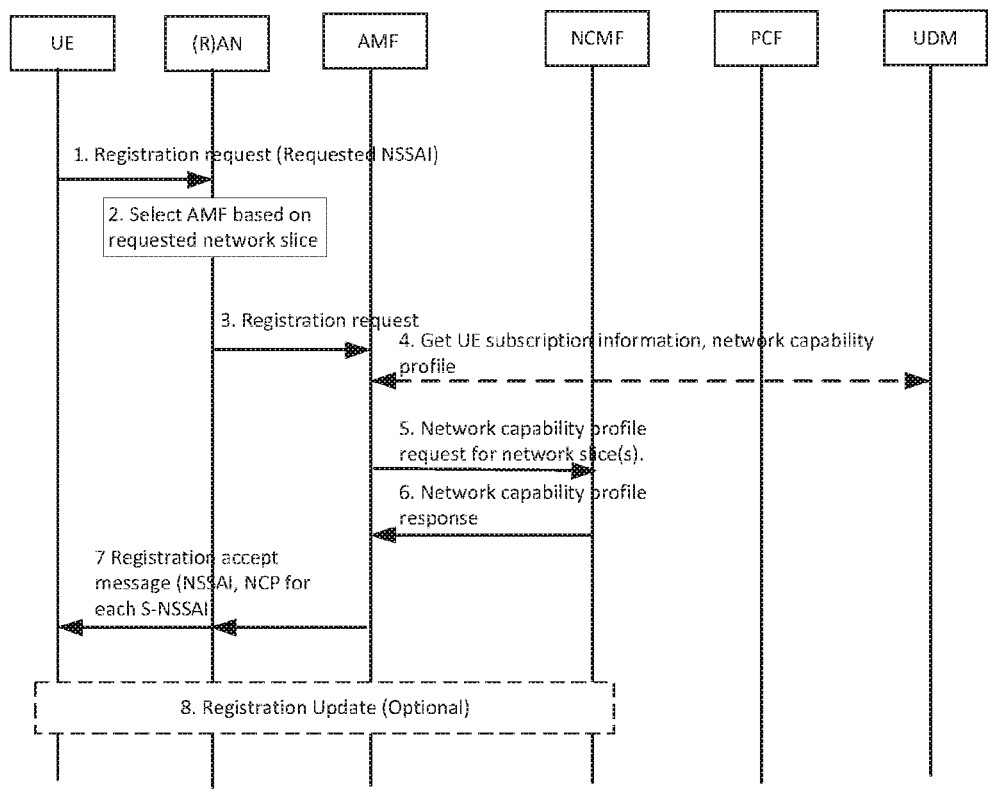
FIG. 13 shows a method for registration procedure with network capability profile for requested NSSAI.

The NCMF may configure network capabilities for network slices and build a network capability profile (NCP) for each slice. This section elaborates on the methods that were described earlier in this document and describes a method by which NCPs may be delivered to the UE along with the NSSAI (e.g. one NCP per S-NSSAI). FIG. 13 depicts the method and illustrates how the Initial Registration procedure may be enhanced to support the configuration of network capabilities, however it should be appreciated that the same enhancements can be applied to the Mobility Registration Update and Periodic Registration Update procedures.

FIG. 13 illustrates how the Initial Registration, Mobility Registration, and Periodic Registration Procedures, which are defined in 3GPP TS 23.502, may be updated. FIG. 13 focuses particularly on the parts of the Registration procedure that may be enhanced or require the most enhancement. Some steps are omitted. Note that FIG. 13 shows that the NCMF is a standalone NF, or logical function. It may instead be part of the OAM system or part of another NF such as the SMF or AMF.

As illustrated in FIG. 13, the AMF may determine the capabilities of the slices that the UE will register to and provide this capability information to the UE. Additionally, the UE could request certain capabilities. Additionally, the network can provide the UE with a list of S-NSSAI's and associated NCP's that the UE can register to.

In Step 1, the UE sends a Registration request, the request includes a Requested NSSAIUE sends request to the AMF via the (R)AN node. The Registration Request may be an Initial Registration, a Mobility Registration Update, or a Periodic Registration Update. As described earlier in this document, the Registration Request may include an NCP to indicate to the network what capabilities are desired for each S-NSSAI in the NSSAI.

In Step 2, the (R)AN node selects an AMF as described in TS 23.501 [1], clause 6.3.5.

In Step 3, the (R)AN node forwards the Registration Request message to the AMF.

In Step 4, based on the Registration request from the UE, AMF may query the UDM/UDR to obtain the UE's subscription. The UE subscription may include the Subscribed S-NSSAI(s).

In Step 5, if the information was not obtained in the previous step, then, for each S-NSSAI in the allowed NSSAI, the AMF may request the Network Capability Profile from the NCMF. The key for such a query should include the S-NSSAIs (i.e. the NSSAI).

Alternatively, the AMF may obtain the NCP that is associated with each S-NSSAI by querying another NF such as the NSSF or NRF to obtain the NCP that is associated with each S-NSSAI.

In Step 6, the NCMF may send the NCP(s) for requested S-NSSAIs back to the AMF.

In Step 7, as part of the Registration Accept message, the AMF sends an Allowed NSSAI and a Configured NSSAI to the UE and an NCP for each S-NSSAI in the Allowed NSSAI and an NCP for each S-NSSAI in the Configured NSSAI. The NCP may be considered part of the Allowed NSSAI and the Configured NSSAI.

Optionally, the network may send an Advertisement NSSAI to the UE. An Advertisement NSSAI is a list of S-NSSAIs and their corresponding NCPs. This list and the corresponding S-NSSAI's may be advertisement of what slices that are available to the UE and an indication of each slice's capabilities. The S-NSSAI's in the Advertisement NSSAI might not be part of the Request NSSAI or Allowed NSSAI. The purpose of the Advertisement NSSAI might be to provide the UE with information about what slices it may request to be added to its Configured NSSAI or Allowed NSSAI. Alternatively, Advertisement NSSAI might be part of the Configured NSSAI.

In Step 8, if the UE determines that the Allowed NSSAI and/or any of the NCP's that are provided with the S-NSSAI are not sufficient in the sense the capabilities of the slice are not sufficient, then the UE may evaluate the Advertisement NSSAI and, if it finds S-NSSAI(s) within the Advertisement NSSAI that are suitable, begin a Registration Update procedure and include S-NSSAI's from the Advertisement NSSAI in the Requested NSSAI. The UE and network may then execute the Registration Update procedure and the Network may update the UE's Allowed NSSAI and Configured NSSAI accordingly.

Network Capability Profile Delivery with UE Policies Update

Figure 14:
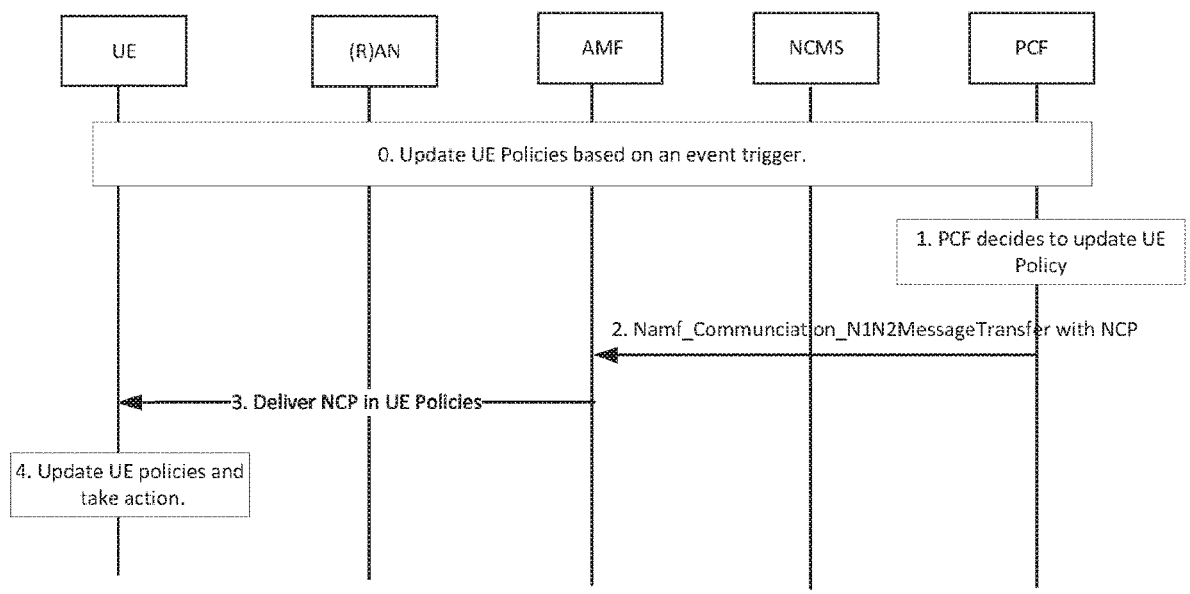
FIG. 14 shows a method for delivery of network capability profile to the UE as a part of UE policy.

NCP related UE policies may be referred to as NCP policies or NCPP. This section describes a method by which a core network may be able to deliver NCP(s) as a part of UE Policies to the UE. Note that NCP Policies may be sent to the UE by using the UE configuration update for transparent UE policy delivery procedure which is defined in 3GPP TS 23.502. FIG. 14 illustrates the method with a focus on how the existing procedure may be enhanced. This method may be triggered by a number of events which are described in step 0.

In Step 0, an event may occur. A notification of the event may be sent to the PCF so that the PCF can determine if NCP Policies need to be updated. Examples of events are:

The OAM system or an authorized AS may send a request to update and NCP. The request may be sent via an NEF. For example, an AS or the OAM may send a request to the NEF to increase the maximum UL or DR data rate that is allowed by a UE in the slice or to increase or decrease the maximum number of PDU sessions that are allowed in a slice.

The PCF receives a notification from an AMF that a UE has changed location (e.g. UE policies may be restricted to a geographic region and hence, new policies may need to be updated.)

The PCF receives a notification that there has been a change of Subscribed 5-NSSAI for a UE or a group of UEs (e.g. network administrator may update UE subscription with a new S-NSSAI).

The PCF receives a notification that a UE has moved from EPS to 5GS. UE will receive new set of UE policies for 5GS.

A UE sends a Policy Update request to the PCF (via NAS). The A UE's request for a UE policy update may be in response to downloading, starting, and/or installing an application that requires a new network capability. For instance, user may download a game application that requires AR/VR settings. This may need a new set of policies to accommodate the change in data rate and other CN resources. The request may include an Application or OS Identifier.

The PCF receives a notification form the OAM or form the NRF that Network Functions that are associated with the slice are reconfigured (e.g. new NF's are instantiated or removed, existing NF's are scaled up or down).

The NCMF sends updated NCP information for an S-NSSAI to the PCF.

In Step 1, the PCF checks the latest list of PSIs to decide which UE access selection and/or PDU Session selection related policies have to be sent to the UE. Either, the PCF has to contact NCMF to get a new set of NCP(s) for the S-NSSAIs or NCMF may send new NCP information for S-NSSAI to the PCF. PCF populates enhanced UE policy, which includes NCPP.

In Step 2, the PCF invokes the AMF's Namf_Communication_N1N2MessageTransfer service operation. The message includes SUPI, UE Policy Container. The UE Policy Container includes NCPP for the UE. In other words, NCP(s) like any other UE policy is treated as UE policies by the 5GS; they are either stand-alone polices or the information is integrated with ANDSP or URSP policies.

In Step 3, if the UE is registered and reachable by AMF in either 3GPP access or non-3GPP access, AMF shall transfer transparently, the UE Policy container (which includes NCPP) to the UE via one of the registered and reachable accesses based on the AMF local policy.

In Step 4, the UE receives and store the NCPP policies. The policies may be considered stand-alone policies or the NCP information that is described here as being part of policies may be provided to the UE as part of URSP Rules or ANDSP.

Examples of how the UE may take action based on the policies are:

If the NCP policy indicates a new periodic traffic rule, UE may need to update the period of reception or transmission for periodic traffic. On the other hand, if the UE did not have policy for periodic traffic, UE may implement new policy by sending and receiving message within in a specified period of time. For example, UE may need to continuously send a sensor reading to a server every 10 sec, which might be updated to 5 seconds as UE is expected to travel in high speed. The periodic traffic rules can be integrated into URSP rules by enhancing the URSP's validation criteria so that communication periods can be indicated to the UE. The UE can then consider this information when URSP rules are evaluated.

If the NCP policy indicates a maximum UL and/or DL data rate, then when the UE evaluates URSP rules, it may consider the maximum and UL and DL dates rates that were provided in the NCP information. The UE may elect to not establish a route that is described in an RSD or a URSP and instead establish a lower precedence route. For example, the lower precedence route might allow for a higher UL or DL maximum data rate. When the route is established, the UE may provide the maximum UL and/or DL data rates to the Application that initiated the traffic and any other applications that use the same route after the route is established. Also, if the NCP indicates a max UL throughput per slice, the UE enforces the limit by monitoring the aggregate throughput of all PDU sessions in the slice.

If the NCP policy indicated location-based messaging and the UE appears to be in the restricted location, UE may need to stop receiving or sending data in the message. The network may provide this information to the UE as validation criteria in URSP rules or the network may provide this information to the UE as a stand-alone NCP policy that is considered when all URSP rules are evaluated. In other words, the policy can be considered when evaluating all routes that include the S-NSSAI from the NCP policy.

The UE may send a Registration Update request to the network in order to register with a different slice that may allow for more favorable NCP policies. In other words, the UE may send a Mobility Registration Update request and the request may include an updated requested NSSAI and the updated requested NSSAI might not include an S-NSSAI that the UE just received policies for.

Handling Maximum Number of PDU Sessions

This section describes procedures on how the network handles pre-defined limit for a number of PDU sessions per network slice and if UE finds that no more PDU sessions can be established, how the request can be handled.

Handling Maximum PDU Sessions During PDU Session Establishment Process

Figure 15:
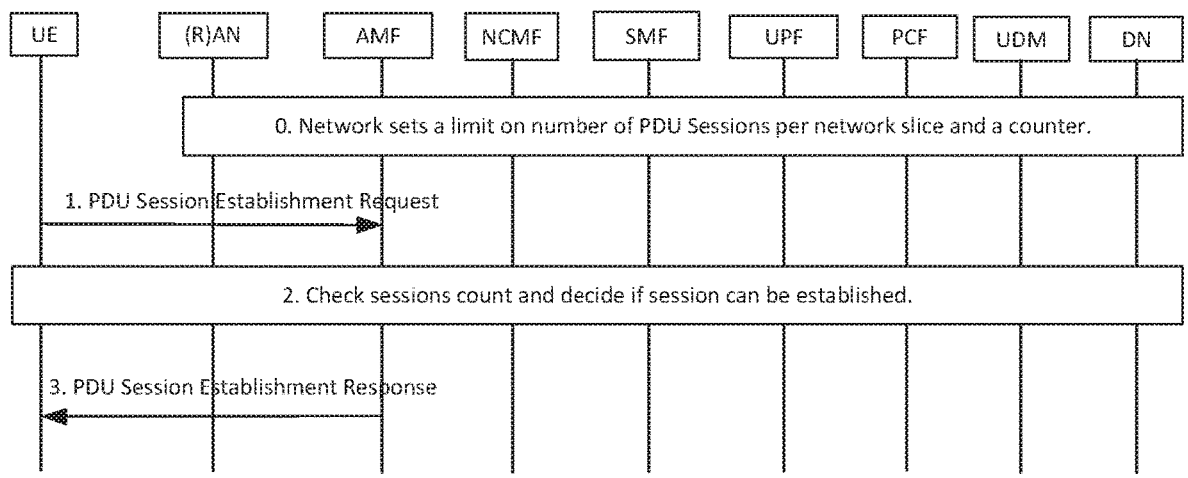
FIG. 15 shows a method for handling maximum number of PDU Sessions in a network slice by the network.

The Network may support a maximum limit on the number of PDU sessions that can be established within a network slice. There may be scenarios where the network slice may attain its maximum limit, but it may still receive PDU session establishment requests from UEs. This section describes how such request may be handled. FIG. 15 depicts the method and illustrates how the existing PDU Session Establishment procedure defined in 3GPP TS 23.502 may be enhanced. FIG. 15 focuses particularly on the parts of the Registration procedure that should be enhanced or require the most enhancement.

In Step 0, the Network Slice is configured with a limit on maximum number allowed PDU sessions per slice. This is either configured in the NCMF. The NCMF includes a PDU Session Counter, which counts the number of PDU sessions joining the network slice. This session counter increments or decrements number by 1 for each PDU Session established or released, respectively. NCMF may receive a notification from the SMF when a PDU Session is established.

In Step 1, the UE sends a PDU Session Establishment request to the AMF via (R)AN node.

In Step 2, upon receiving the PDU Session Establishment request from the UE, the AMF or SMF sends a request to the NCMF to check if a new PDU Session may be established in the slice. The request includes the S-NSSAI. The NCMF checks if the Slice's PDU Session counter to see if it the number of PDU Sessions in the slice is below the maximum value. If the NCMF indicates that the number of PDU Sessions is below the maximum value, then the PDU Session will be allowed, otherwise it will not be allowed and the PDU Session Establishment request will be rejected.

In Step 3, the rest of the PDU Session Establishment procedure from TS 23.501 is executed and the PDU Sessions Establishment Response is sent to the UE. If the NCMF indicated to the AMF or SMF that the PDU Session should not be allowed (i.e. that the Slice has reached the maximum number of PDU Sessions), then the AMF or SMF may send an Error/Cause Code to the UE indicating that the network slice has attained its maximum limit for PDU sessions count and reject the request. In this case, the UE may re-evaluate its URSP rules and attempt to establish a PDU session within a different slice. The response may also include a wait timer, which indicates how long the UE must wait before attempting to establish a PDU Sessions within the same slice. Although the UE may reset the wait timer and attempt again if it terminates a PDU session with the same slice before the wait timer expires. The wait time may be integrated into Time Window (Route Selection Validation Criteria) in the URSP rules. Hence, URSP rule is re-evaluated before re-attempting to establish a PDU session.

After receiving a PDU Session Establishment Reject Message the UE may:
  Reevaluate its URSP rules with the knowledge that that the reject slice is unavailable and attempt to establish a PDU Session based on a lower precedence URSP or RSD rule.
  Wait for the duration of the wait timer and then reevaluate its URSP rules and attempt to establish a PDU Session again within the same slice.
  Terminate a PDU Session with the same slice, clear/void the wait timer if it has not expired, and then reevaluate its URSP rules and attempt to establish a PDU Session again within the same slice. It is proposed that the PDU Session Establishment Request be modified to allow the UE to indicate PDU Session IDs from the slice that can be terminated. This enhancement to the PDU Session Establishment procedure may be desirable in cases where a slice is PDU Session limited and the UE is willing to terminate a lower priority PDU Session on the condition that it can immediately reestablish a new, higher priority, PDU Session.

Handling Maximum PDU Sessions Using a NAS Notification

Figure 16:
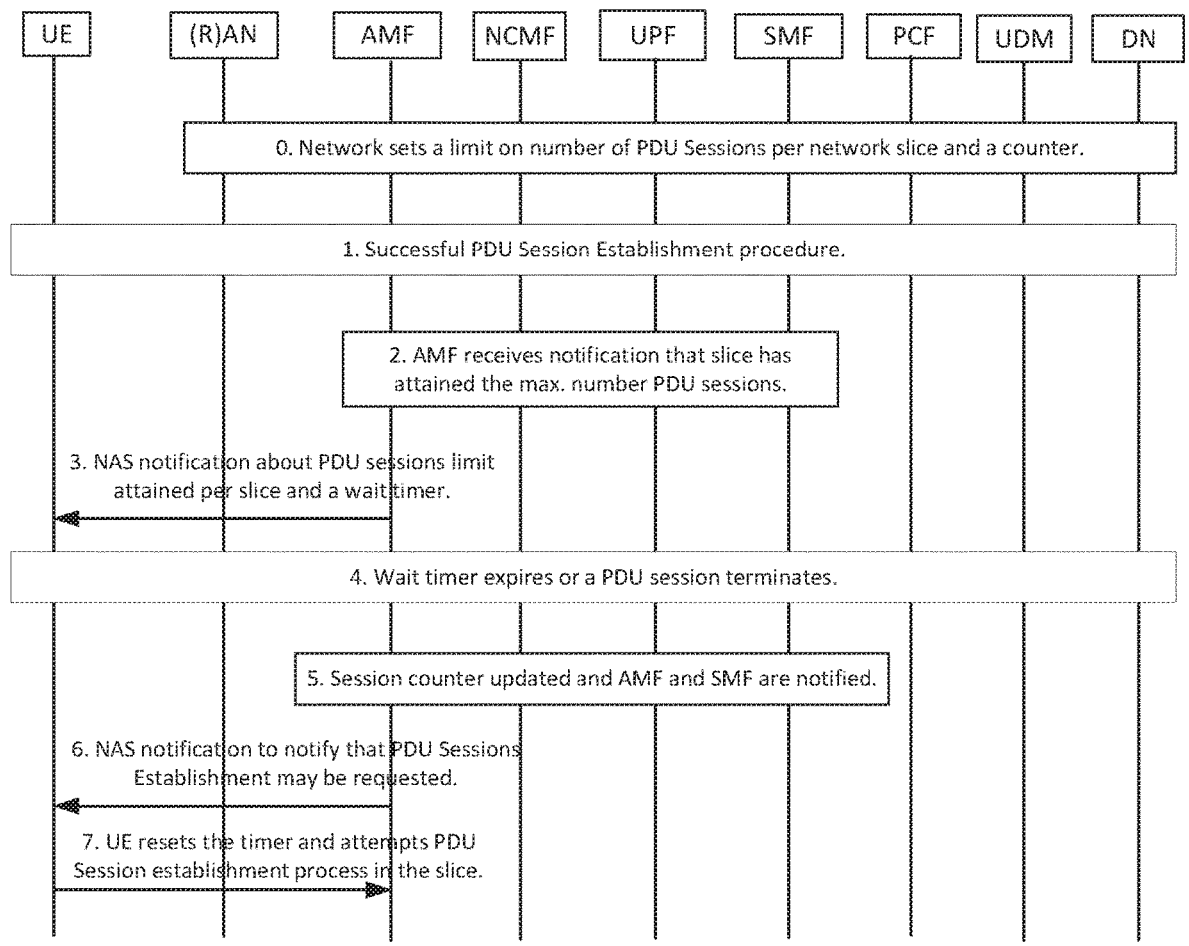
FIG. 16 shows method for handling maximum number of PDU Sessions in a network slice using a NAS Notification.

This section describes a method in which NAS notification is used to inform the UE that a network slice has attained its maximum limit. FIG. 16 depicts the method.

In Step 0, the Network Slice is configured with a limit on maximum number allowed PDU sessions per slice. This is either configured in the NCMF. The NCMF includes a PDU Session Counter, which counts the number of PDU sessions joining the network slice. This session counter increments or decrements number by 1 for each PDU Session established or released, respectively. NCMF may receive a notification from the SMF when a PDU Session is established. The AMFs and SMFs within the slice subscribe to the NCMF to be notified when the number of PDU Sessions within the slice reaches the maximum value or falls below the maximum value.

In Step 1, A UE and the network execute PDU Sessions Establishment Procedure as described in section 4.3.2.2.1 of 3GPP TS 23.502. Upon receiving the PDU Session Establishment request from the UE, the AMF or SMF sends a request to the NCMF to check if a new PDU Session may be established in the slice. The request includes the S-NSSAI. The NCMF checks if the Slice's PDU Session counter to see if it the number of PDU Sessions in the slice is below the maximum value. If the NCMF indicates that the number of PDU Sessions is below the maximum value, then the PDU Session will be allowed, otherwise it will not be allowed and the PDU Session Establishment request will be rejected. The case where the PDU Session was rejected was described earlier in this document. In the example of this procedure, it is assumed that the PDU Session Establishment is successful.

In Step 2, the AMF or SMF receives a notification from the NCMF that the network slice has reached the maximum number of PDU Sessions.

In Step 3, the AMF sends a NAS notification to all UE's that are registered to the slice. The NAS notification includes a wait timer, which indicates how long the UE must wait before attempting to establish a PDU Sessions within the slice. Although the UE may reset the wait timer and attempt again if it terminates a PDU session with the same slice before the wait timer expires. The wait time may be integrated into the Time Window of the Route Selection Validation Criteria in the URSP rules. URSP rules would be re-evaluated before reattempting to establish a PDU session.

In Step 4, the Wait Timer Expires or a UE terminates a PDU Session with the same slice.

In Step 5, the PDU Session Termination Procedure causes the NCMF counter to be decremented and the PDU Session Counter to fall below a predetermined value. The NCMF sends a notification to the AMF and SMF when the number of PDU Sessions within the slice falls below the predetermined value.

In Step 6, the AMF sends a NAS notification to all UE's that are registered to the slice. The NAS notification indicates that the condition has been cleared and PDU Sessions may now be established in the slice. Alternatively, the notification may only be sent to UE's whose PDU Session Establishment Requests were rejected with a cause code.

In Step 7, the UE may reset the wait timer and attempt to establish a PDU Session in the slice.

Handling Maximum Number of UEs in a Network Slice

Figure 17:
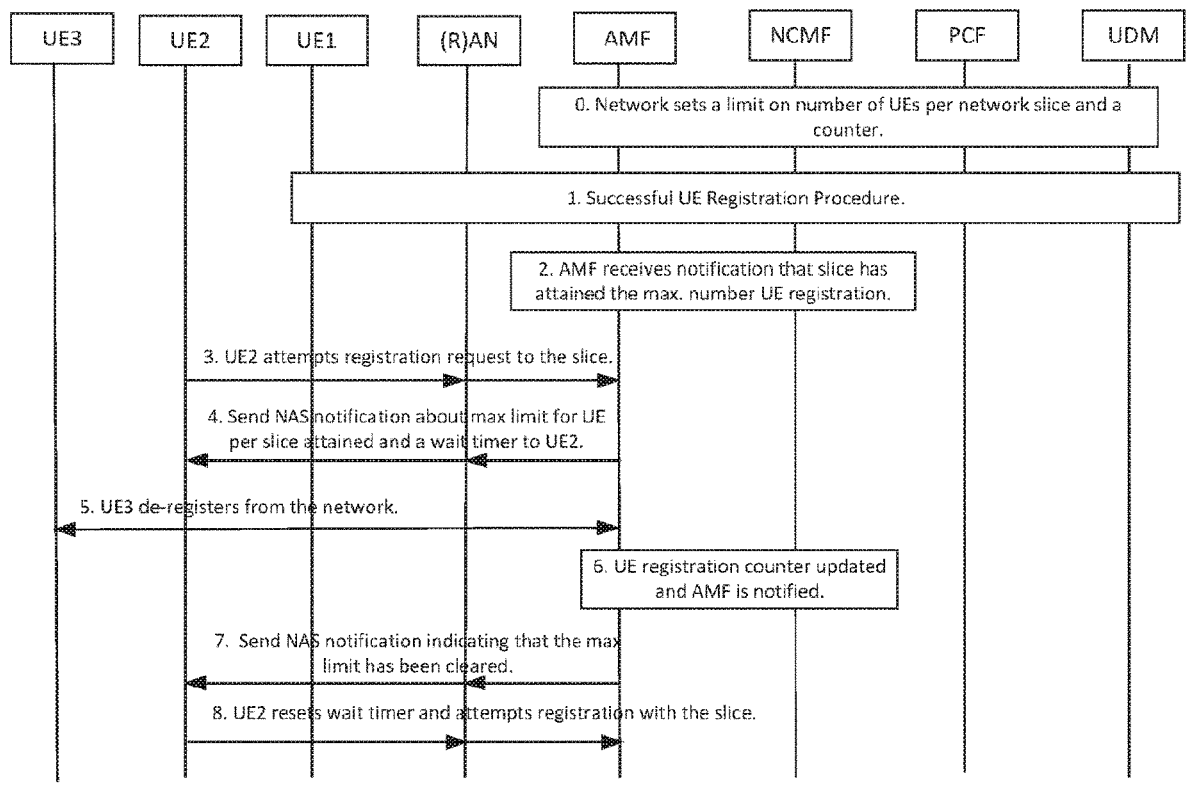
FIG. 17 shows a procedure of handling maximum number of UEs limit in a network slice.

The Network may be equipped with a capability to limits maximum number of UEs that can be registered with the network slice at a time. There may be scenarios where the network may receive a request from a UE to register to a network slice that has attained its maximum limit of registered UEs. This section describes a method for handling such a case. FIG. 17 depicts the method.

In Step 0, the counter may be maintained in the NCMF. The counter increments or decrements count by 1 for each UE registered or de-registered. When a UE is registered or de-registered, the AMF may send an indication/notification to the NCMF so that the counter can be in incremented or decremented accordingly. The NCMF may have subscribed to all AMF(s) in the slice so that it can receive a notification when a UE registers to the slice. The subscription request may indicate the S-NSSAI and the notification from the AMF may include the UE ID and S-NSSAI so that the NCMF can keep track of what UE are registered, query the status of registered UEs, and avoid counting errors in situations where notifications about the registration or deregistration of UEs are received. The NCMF may also indicate to the AMF that the number of UEs registered to the Slice is limited, so that the AMF knows to check with the NCMF for permission to register a new UE (i.e. check that the limit has not been hit).

In Step 1, a UE (UE1) and the network execute the UE Registration Procedure as described in section 4.2.2.2.2 of 3GPP TS 23.502. Upon receiving the UE registration request from UE1, the AMF sends a request to the NCMF, or invokes an NCMF service, to check if a new UE may be registered in the slice. The request includes the S-NSSAI. The NCMF checks the slice's UE Registration counter to see if it the number of UE registered in the slice is below the maximum value. If the NCMF indicates that the number of UE registered in the slice is below the maximum value, then the UE registration is allowed, otherwise it will not be allowed, and the UE registration request will be rejected. In this step of this procedure, it is assumed that the UE registration from UE1 is successful.

In Step 2, the AMF may receive a notification from the NCMF that the network slice has reached the maximum number of UEs. The NCMF may provide the AMF with a wait timer to indicate how long the UE should wait before reattempting to register with the S-NSSAI.

In Step 3, a different UE (e.g. UE2) may send a UE registration request to the network. The request may indicate, for each slice, that, if registration to a slice is rejected, the UE would like to receive a notification when the rejection cause has been cleared.

Note: If the AMF did not already receive a notification from the NCMF that the network slice has reached the maximum number of UEs, the AMF may query the NCMF to check if it is ok to register UE, as described in Step 1.

In Step 4, if the AMF has been informed that the network slice has reached its maximum number of UE registration limit, the AMF may send a UE Registration Response message to UE2, which indicates that the request has been rejected and a cause value which indicates that the request was rejected because the slice has attained the maximum number of registered UEs. The rejection may also provide the UE with a wait timer that the UE should use to determine when it may try to request UE registration again in the same slice. Otherwise, if the slice limit has not been reached, UE2 and Network execute the Registration Procedure as described in section 4.2.2.2.2 of 3GPP TS 23.502.

In Step 5, a UE (e.g. UE3), which was already registered in the network slice may de-register with the network slice.

In Step 6, the AMF may notify the NCMF about this UE de-registration. The NCMF may decrement the counter. In addition, NCMF may send a notification letting the AMF know that the network slice is now below its maximum limit.

In Step 7, the AMF may send a NAS notification to any UE (e.g. UE2), that was rejected from registration with a cause code (i.e. a message about network slice attaining maximum limit and a wait timer) and has a wait timer still running. This NAS notification indicates that the limit condition has been removed.

In Step 8, upon receiving the NAS message from the network, UE2 may reset the wait timer and attempt to register with the slice.

Alternatively, UE may attempt UE registration after the wait timer expires.

Note that this procedure can be considered an extension, or enhanced explanation, of the Network Capability Based Registration procedure that was described earlier in this document.

Handling of Maximum UL and DL Data Rates within a Slice

As described above, the network may provide, to the UE, the maximum UL and DL data rates that the UE can use within a slice. These maximum data rates are applied across all PDU Sessions within the slice.

The network may also provide this information to the UE whenever a PDU session is established within the slice.

The network may send a NAS notification to the UE whenever the network detects that the UE has exceeded the maximum UL or DL data rate within the slice. The notification may indicate the maximum UL or DL data rate to the UE so that the UE can enforce it.

NCMF Service

As discussed above, the NCMF is responsible for managing and maintaining the information related to network capabilities and network slices. Table 5 shows a list of NCMF services that may be provided to enable these operations.

TABLE 1

List of NCMF Services

| Service Name | Service Operations | Operation Semantics | Example Consumer(s) |
|---|---|---|---|
| Nncmf_Network Capability | Retrieve | Request/ Response | AMF, NSSF, NEF |
| | Update | Request/ Response | AMF, NSSF, OAM |
| | Add | Request/ Response | AMF, NSSF, OAM |
| | Remove | Request/ Response | AMF, NSSF, OAM |
| | Subscribe | Subscribe/ Notify | AMF, NSSF, OAM, NEF |
| | Unsubscribe | Subscribe/ Notify | AMF, NSSF, OAM, NEF |
| | Notify | Subscribe/ Notify | AMF, NSSF, OAM, NEF |

Alternatively, if the NCMF is co-located with the NSSF or UDM/UDR, the NCMF services shown in Table 5 may be defined as NSSF services or UDM/UDR services.

New UPF Service

Figure 11:
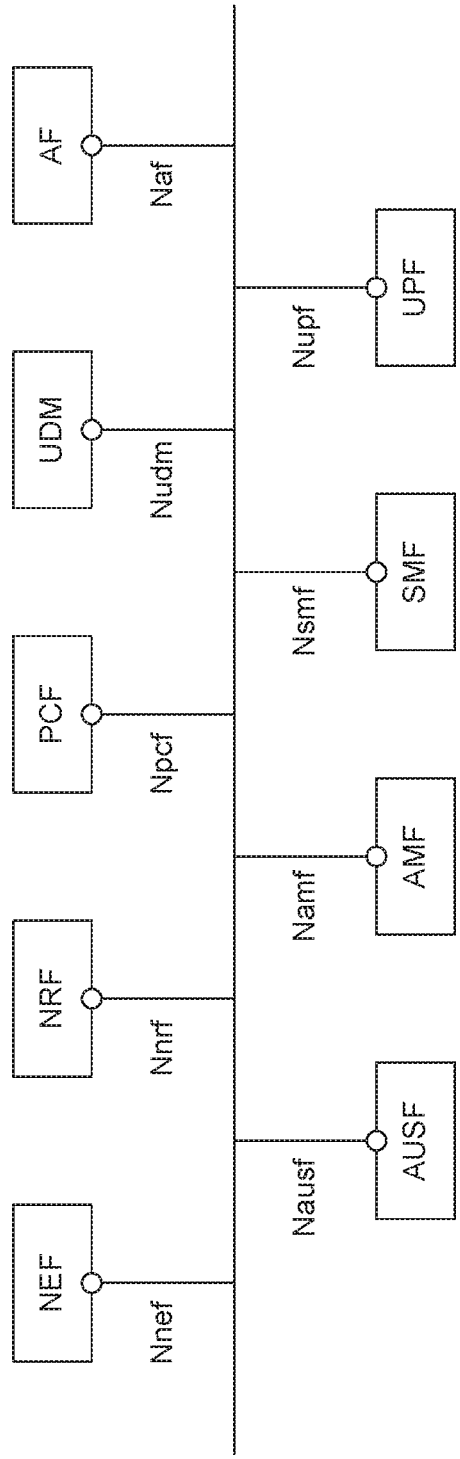
FIG. 11 shows an example extended service-based architecture with a UPF and an Nupf interface.

In the 5G service based architecture, the UPF is not involved as a user plane function. However, it can be seen that the UPF has some control functionalities, such as QoS enforcement, data buffering and event monitoring. Some UPF services may be added by extending the service based architecture to the UPF. FIG. 11 shows an extended service based architecture with a UPF and Nupf interface. Table 6 shows a list of UPF services.

TABLE 2

Lists of UPF Service

| Service Name | Service Operations | Operation Semantics | Example Consumers |
|---|---|---|---|
| Nupf_EventExposure | Subscribe Unsubscribe Notify | Subscribe/ Notify | SMF, PCF, AMF, AF, NWDAF, NEF, Charging Function |
| Nupf_Status | StatusRetrieve | Request/ Response | SMF, AMF, PCF, AF, NWDAF, NEF, Charging Function |
| Nupf_PDUSession | Create Update Release | Request/ Response | SMF |

Nupf_EventExposure

This service offers other NFs to subscribe to certain events at the UPF, and get notified when the subscribed events occurs. The UPF may provide subscription service for the following events:

- DL data packet buffered at the UPF is dropped due to timeout threshold or limited storage. This could be per QoS flow, per session, per UE or per UPF.
- A UPF is selected as an uplink classifier for local data network or branching point for multi-homed PDU session.
- UPF is selected as the anchor point of a PDU session via 3GPP access or non-3GPP access (i.e., through N3IWF).
- A packet is dropped because policy rule is enforced on a particular traffic by the UPF, including the information of SCS/AS originating the traffic, and what specific rule is enforced.
- The total number of connected UEs supported by the UPF exceeds a certain threshold.
- Total number, or rate of, rejected or failed connection attempts exceeds a threshold. This could be further qualified to request a notification if the total number, or rate of, ejected or failed connection attempts with a particular cause value passes a threshold.
- Computing resources are low than a threshold.
- The total number of the sessions that the UPF is managing exceeds a certain threshold.
- The total (guaranteed) data rates of the sessions that the UPF is managing exceeds a certain threshold.
- The utilization of the memory allocated for downlink data buffering exceeds a certain threshold.
- The mapping of DL data traffic to QoS flow fails with no PDR fits the application data.

The following information may be involved in the (un) subscription request or notification message:

- subscription ID
- notification address/ID
- Event ID and the corresponding parameters: for example, if the event that happens is that an PDU session is congested, then the PDU session ID, QFIs and resource utilization percentage will be included. If the event that happens is that a packet is dropped, then the cause of drop, the session ID, QFI and number of packets buffered at UPF will be provided.

The NEF may be a service consumer in the case that the AF cannot direct access the UPF via the service based interface.

Nupf_StatusMonitoring

This service offers NFs the opportunity to get information from UPF about PDU session status and QoS enforcement status. The UPF may provide the following information through this service:

- Number of PDU sessions the UPF is serving as the anchor point, branching point or uplink classifier, respectively.
- Amount of downlink data buffered at UPF. This could be per application, per UE, per group of UEs, per PDU session, per QoS flow or per a location (i.e., within a network area).
- The number of PDU sessions that connect a UE via non-3GPP access.
- The bit rate that is currently realized. This could be per application, per UE, per group of UEs, per PDU session, per QoS flow or per location (i.e., within a network area).
- The packet error rate (loss rate). This could be per application, per UE, per group of UEs, per PDU session, per QoS flow or per location (i.e., within a network area).
- Percentage of the storage resource used for data buffering.
- Charing related information, such as CDR.

NEF may be a service consumer in the case that the AF cannot direct access the UPF via the service-based interface.

Nupf_PDUSession

Figure 12:
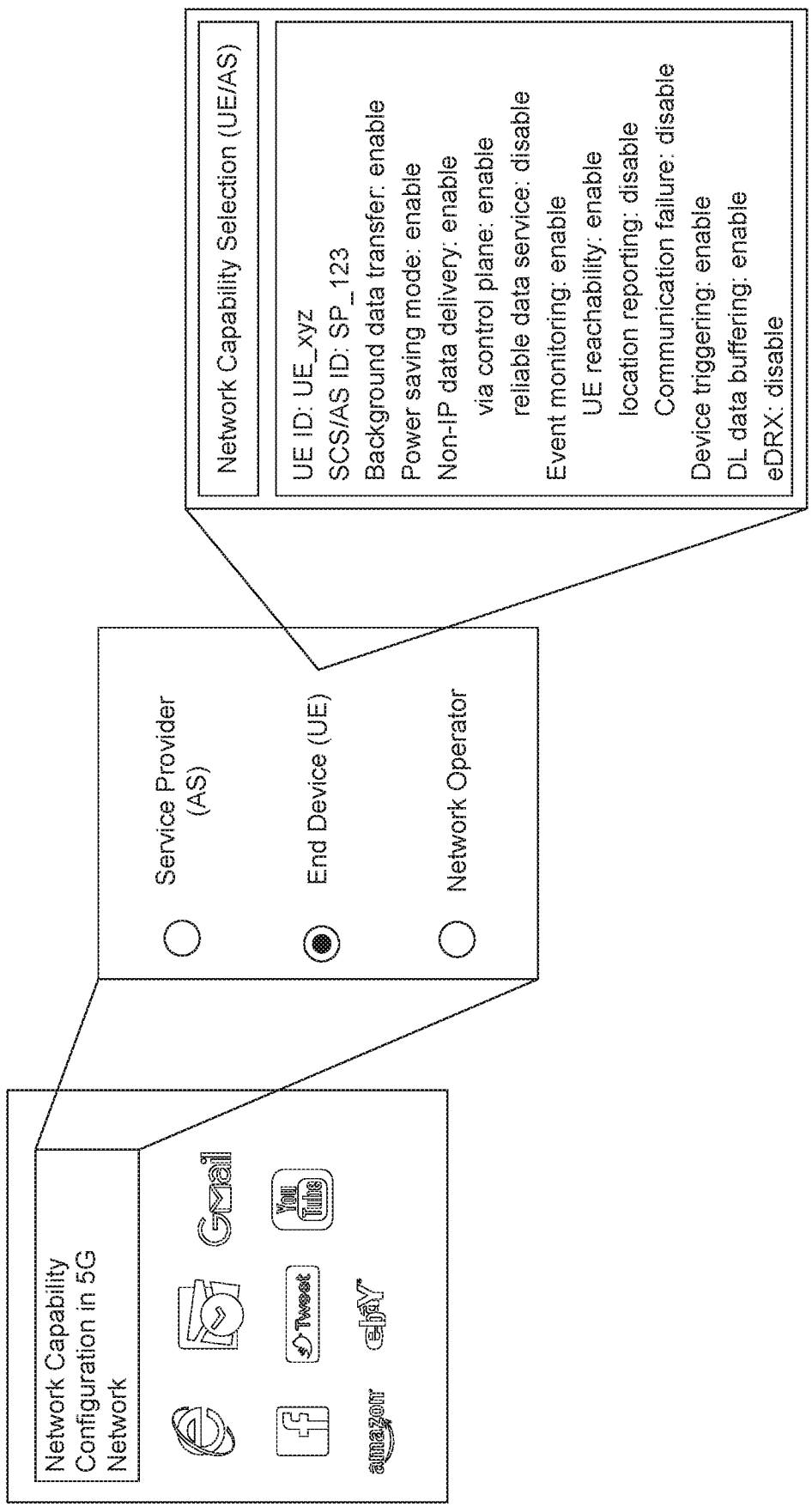
FIG. 12 shows an example graphical user interface (GUI) for configuration network capability in a communications network.

This service offers the ability for the SMF to initiate certain procedures to manage PDU sessions, such as create, update and release a PDU session. SMF may include the following information for the PDU session related procedure:

- PDU session ID and associated network slice ID, such as S-NSSAI and network slice instance ID
- DNN
- PDU session type, e.g., non-IP, Ethernet or IP type
- Session and service continuity (SSC) mode
- QFIs and related QoS parameters, such as maximum bit rate per QoS, maximum aggregated bit rate per session, maximum packet loss rate
- Indication of supporting reflective QoS
- Packet detection rules (PDR) for both DL and UL traffic
- SMF information, such as SMF ID, SMF instance ID
- Tunnel information for the N3 and N6 (e.g., for NIDD forwarding) tunnel respectively
- Charging policy ID
- Indication that the UPF is added or removed as an uplink classifier or branching point related to a PDU session.
- UE ID, such as 5G-GUTI and SUPI
- IP address and port number Example Graphical User Interface FIG. 12 shows an exemplary user interface that may be used to configure network capability(ies) in a 5G network. The user interface may be displayed by of for an end device (UE), a service provider (SCS/AS), a network operator, or other network entity or user. For example, the user interface may be displayed on display 128 or 86 of FIGS. 1B and 1G, respectively.

Figure 18:
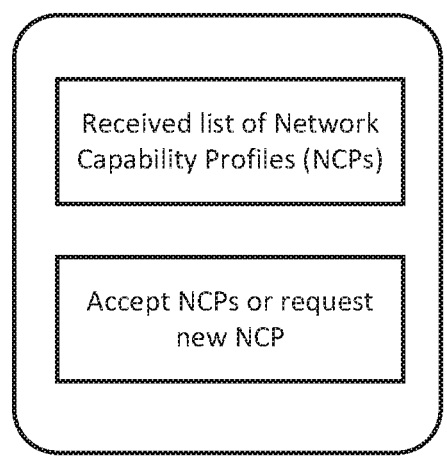
FIG. 18 shows an example graphical user interface (GUI) which show that UE receives NCPs from the network and UE either accepts NCPs or is able to request new NCPs.

FIG. 18 depicts a user interface by which a UE may receive NCPs for allowed S-NSSAIs from the network. Based on the application requirements, the UE can accept a network slice based on received NCPs or request a new NCP/network slice from the core network.

It is understood that the network entities described above, including those performing the steps illustrated in FIGS. 8-10, such as the UE, (R)AN, AMF, NCMF, NSSF, UDR/UDSF, UDM/UDR, NRF, NEF, PCF, NFs, SCS/AS, (R)AN, SMF, and the like, may be logical entities that may be implemented in the form of software (i.e., computer-executable instructions) stored in a memory of, and executing on a processor of, an apparatus configured for wireless and/or network communications or a computer system such as those illustrated in FIG. 1B or FIG. 1G. That is, the method(s) illustrated in FIGS. 8-10 may be implemented in the form of software (i.e., computer-executable instructions) stored in a memory of an apparatus, such as the apparatus or computer system illustrated in FIG. 1B or FIG. 1G, which computer executable instructions, when executed by a processor of the apparatus, perform the steps illustrated in FIGS. 8-10. It is also understood that the functionality illustrated in FIGS. 8-10 may implemented as a set of virtualized network functions. The network functions may not necessarily communicate directly, rather, they may communicate via forwarding or routing function. It is also understood that any transmitting and receiving steps illustrated in FIGS. 8-10 may be performed by communication circuitry of the apparatus under control of the processor of the apparatus and the computer-executable instructions (e.g., software) that it executes.

Additional embodiments may include:

1. An apparatus comprising a processor and a memory, the memory storing computer-executable instructions that, when executed by the processor, cause the apparatus to perform operations comprising:
    sending, to an entity of a core network of a communications network, a request for network capability configuration, the request comprising a list of one or more network capabilities requested by the apparatus; and
    receiving, from the core network entity, a response comprising an identifier of a network slice that supports the requested one or more network capabilities.
2. The apparatus recited in embodiment 1, wherein the request further comprises one or more of:
    an identifier for each of the one or more requested network capabilities;
    one or more network slice IDs and/or network slice selection information for supporting the one or more requested network capabilities; and
    an identifier for each of one or more applications hosted on the apparatus that require the requested network capabilities.
3. The apparatus of recited in embodiment 2, wherein the request further comprises one or more of:
    an identifier of the apparatus;
    an identifier of a public land mobile network (PLMN) to which the apparatus may register;
    information associated with a geographic area in which the apparatus is requesting the network capabilities.
4. The apparatus recited in embodiment 2, wherein the request further comprises one or more of:
    information specifying an availability schedule associated with the one or more requested network capabilities;
    information specifying a quality of service (QoS) level associated with the one or more requested network capabilities; and
    information specifying a level of multitenancy associated with the one or more requested network capabilities.
5. A method performed by a user equipment (UE), comprising:
    sending, to an entity of a core network of a communications network, a request for network capability configuration, the request comprising a list of one or more network capabilities requested by the UE; and
    receiving, from the core network entity, a response comprising an identifier of a network slice that supports the requested one or more network capabilities.
6. The method recited in embodiment 5, wherein the request further comprises one or more of:
    an identifier for each of the one or more requested network capabilities;
    one or more network slice IDs and/or network slice selection information for supporting the one or more requested network capabilities; and
    an identifier for each of one or more applications hosted on the UE that require the requested network capabilities.
7. The method recited in embodiment 6, wherein the request further comprises one or more of:
    an identifier of the UE;
    an identifier of a public land mobile network (PLMN) to which the UE may register;
    information associated with a geographic area in which the UE is requesting the network capabilities.
8. The method recited in embodiment 6, wherein the request further comprises one or more of:
    information specifying an availability schedule associated with the one or more requested network capabilities;
    information specifying a quality of service (QoS) level associated with the one or more requested network capabilities; and
    information specifying a level of multitenancy associated with the one or more requested network capabilities.
9. An apparatus implementing an entity of a core network, the apparatus comprising a processor and a memory, the memory storing computer-executable instructions that, when executed by the processor, cause the core network entity to perform operations comprising:
    receiving, from a user equipment (UE), a request comprising a list of one or more network capabilities requested by the UE;
    determining, based on a network capability profile associated with a network slice currently serving the UE, whether the network slice currently serving the UE supports the one or more requested network capabilities;
    if the network slice currently serving the UE cannot support the one or more requested network capabilities, formulating or selecting a new network slice to serve the UE that can support the one or more requested network capabilities; and
    sending, to the UE, a response comprising an identifier of the network slice that is selected to support the one or more requested network capabilities.
10. The apparatus recited in embodiment 9, wherein the network capability profile comprises one or more of:
    an identifier of network slice and corresponding network slice instances;
    a list of identifiers of supported network capabilities;
    an identifier of a serving PLMN; and
    serving area information for each network capability.
11. The apparatus recited in embodiment 9, wherein the wherein the request further comprises one or more of:
    an identifier for each of the one or more requested network capabilities;
    one or more network slice IDs and/or network slice selection information for supporting the one or more requested network capabilities; and
    an identifier for each of one or more applications hosted on the user equipment that require the requested network capabilities.
12. The apparatus recited in embodiment 9, wherein the instructions further cause the core network entity to perform operations comprising initiating the new network slice.
13. The apparatus recited in embodiment 9, wherein the instructions further cause the core network entity to perform operations comprising selecting a new core network entity that terminates a Non Access Stratum (NAS) signaling with the UE serving the newly selected network slice.

14. The apparatus recited in embodiment 9, wherein the instructions further cause the core network entity to perform operations comprising updating a network capability profile associated with the newly selected network slice.

15. A method performed by an entity of a core network, comprising:
   receiving, from a user equipment (UE), a request comprising a list of one or more network capabilities requested by the UE;
   determining, based on a network capability profile associated with a network slice currently serving the UE, whether the network slice currently serving the UE supports the one or more requested network capabilities;
   if the network slice currently serving the UE cannot support the one or more requested network capabilities, formulating or selecting a new network slice to serve the UE that can support the one or more requested network capabilities; and
   sending, to the UE, a response comprising an identifier of the network slice that is selected to support the one or more requested network capabilities.

16. The method recited in embodiment 15, wherein the network capability profile comprises one or more of:
   an identifier of network slice and corresponding network slice instances;
   a list of identifiers of supported network capabilities;
   an identifier of a serving PLMN; and
   serving area information for each network capability.

17. The method recited in embodiment 15, wherein the wherein the request further comprises one or more of:
   an identifier for each of the one or more requested network capabilities;
   one or more network slice IDs and/or network slice selection information for supporting the one or more requested network capabilities; and
   an identifier for each of one or more applications hosted on the user equipment that require the requested network capabilities.

18. The method recited in embodiment 15, further comprising initiating the new network slice.

19. The method recited in embodiment 15, further comprising selecting a new core network entity that terminates a Non Access Stratum (NAS) signaling with the UE serving the newly selected network slice.

20. The method recited in embodiment 15, further comprising updating a network capability profile associated with the newly selected network slice.

21. An apparatus comprising a processor and a memory, the memory storing computer-executable instructions that, when executed by the processor, cause the apparatus to perform operations comprising:
   receiving message from an Access and Mobility Management Function (AMF) of a network slice in the core network of a communication network, wherein the message comprises a request for a determination whether a threshold has been met; and
   sending a response to the message to the AMF.

22. The apparatus recited in embodiment 21, wherein the apparatus may have subscribed to Access and Mobility Management Functions in the network slice so that it can receive a notification when a user equipment either requests for registration to the slice or attempts for PDU session establishment with the network slice.

23. The apparatus recited in embodiment 21, wherein the request comprises a network slice identifier and a user equipment identity.

24. The apparatus recited in embodiment 21, wherein the apparatus employs a counter which increments or decrements a count for every user equipment registered or de-registered with the network slice of the core network.

25. The apparatus recited in embodiment 21, wherein the apparatus employs a counter which increments or decrements a count for every PDU session established or ended by a user equipment with the network slice of the core network.

26. The apparatus recited in embodiment 21, wherein the response to the AMF comprises a notification indicating that the network slice has attained its threshold.

27. The apparatus recited in embodiment 21, wherein the response to the Access and Mobility Management Function comprises a wait timer to indicate how long a user equipment should wait before reattempting to register or reattempting to establish a PDU session with the network slice, when the threshold has been attained.

The illustrations of the aspects described herein are intended to provide a general understanding of the structure, function, and operation of the various aspects. The illustrations are not intended to serve as a complete description of all of the elements and features of apparatuses and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. An apparatus implementing a first network function and comprising a processor and a memory, the memory storing instructions that, when executed by the processor, cause the apparatus to perform operations comprising:
   receiving, by the first network function from a wireless transmit/receive unit (WTRU), a first message, wherein the first message is indicative of an operation requested to be performed with a network slice and wherein the operation comprises a slice registration;
   sending, by the first network function to a second network function, a second message, wherein the second message is indicative of a request for a determination of whether a threshold related to the operation is met, wherein the threshold is associated with a maximum number of WTRUs that can be registered with the network slice;
   receiving, by the first network function from the second network function, a first response indicative of the determination of whether the threshold is met; and sending, by the first network function to the WTRU, a second response comprising an indication of whether the operation is allowed, wherein when the operation is not allowed, the second response comprises a reject code indicating that the operation is rejected as a result of the network slice having attained the maximum number of registered WTRUs.

2. The apparatus recited in claim 1, wherein the first network function comprises an Access and Mobility Management Function (AMF).

3. The apparatus recited in claim 1, wherein the second network function comprises a Network Capability Management Function (NCMF).

4. The apparatus recited in claim 1, wherein the second response comprises an indication of an amount of time the WTRU is to wait until sending another message indicative of a request for the operation to be performed.

5. The apparatus recited in claim 1, wherein the instructions further cause the apparatus to send, to the WTRU, a non access stratum (NAS) message comprising an indication that the WTRU may send another message indicative of a request for the operation to be performed.

6. A wireless transmit/receive unit (WTRU) comprising a processor and a memory, the memory storing instructions that, when executed by the processor, cause the WTRU to perform operations comprising:
sending, to a network function, a first message indicative of an operation requested to be performed with a network slice, wherein the operation comprises a slice registration; and
receiving, from the network function, a response comprising a reject code indicating that the operation is rejected as a result of the network slice having attained a maximum number of registered WTRUs.

7. The WTRU recited in claim 6, wherein the network function comprises an Access and Mobility Management Function (AMF).

8. The WTRU recited in claim 6, wherein the response further comprises an indication of an amount of time the WTRU is to wait until sending another message indicative of a request for the operation to be performed.

9. The WTRU recited in claim 8, wherein the instructions further cause the WTRU to send, after expiration of the amount of time, another message indicative of a request for the operation to be performed.

10. The WTRU recited in claim 6, wherein the instructions further cause the WTRU, based on the response, to terminate the slice registration.

11. The WTRU recited in claim 6, wherein the instructions further cause the WTRU to:
receive, from the network function, a non access stratum (NAS) message comprising an indication that the operation may be requested again; and
send, in response to the NAS message, another message indicative of a request for the operation to be performed.

12. A method performed by a wireless transmit/receive unit (WTRU), the method comprising:
sending, to a network function, a first message indicative of an operation requested to be performed with a network slice, wherein the operation comprises a slice registration; and
receiving, from the network function, a response comprising a reject code indicating that the operation is rejected as a result of the network slice having attained a maximum number of registered WTRUs.

13. The method recited in claim 12, wherein the network function comprises an Access and Mobility Management Function (AMF).

14. The method recited in claim 12, wherein the response further comprises an indication of an amount of time the WTRU is to wait until sending another message indicative of a request for the operation to be performed.

15. The method recited in claim 14, further comprising sending, after expiration of the amount of time, another message indicative of a request for the operation to be performed.

16. The method recited in claim 12, further comprising terminating, based on the response, the slice registration.

17. The method recited in claim 12, further comprising:
receiving, from the network function, a non access stratum (NAS) message comprising an indication that the operation may be requested again; and
sending, in response to the NAS message, another message indicative of a request for the operation to be performed.

* * * * *